(12) United States Patent
Unno

(10) Patent No.: US 12,348,687 B2
(45) Date of Patent: Jul. 1, 2025

(54) INFORMATION PROCESSING SYSTEM, INFORMATION PROCESSING APPARATUS, AND CONTROL METHOD THEREFOR

(71) Applicant: CANON KABUSHIKI KAISHA, Tokyo (JP)

(72) Inventor: Koichi Unno, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 17/504,203

(22) Filed: Oct. 18, 2021

(65) Prior Publication Data

US 2022/0038587 A1 Feb. 3, 2022

Related U.S. Application Data

(63) Continuation of application No. 16/884,543, filed on May 27, 2020, now Pat. No. 11,178,294.

(30) Foreign Application Priority Data

May 30, 2019 (JP) .................................. 2019-101781

(51) Int. Cl.
H04N 1/00 (2006.01)

(52) U.S. Cl.
CPC ....... *H04N 1/00344* (2013.01); *H04N 1/0044* (2013.01); *H04N 1/00482* (2013.01); *H04N 2201/0094* (2013.01)

(58) Field of Classification Search
CPC ............. H04N 1/00344; H04N 1/0044; H04N 1/00482; H04N 2201/0094
USPC ....................................................... 358/1.15
See application file for complete search history.

(56) References Cited

U.S. PATENT DOCUMENTS

| | | | | |
|---|---|---|---|---|
| 2006/0293765 | A1* | 12/2006 | Tanaka | H04N 1/00413 700/83 |
| 2016/0352935 | A1* | 12/2016 | Hirama | H04N 1/00344 |
| 2018/0115679 | A1* | 4/2018 | Kusano | H04N 1/00424 |

FOREIGN PATENT DOCUMENTS

| | | | |
|---|---|---|---|
| JP | 2001341387 A | * | 12/2001 |
| JP | 2005-130407 A | | 5/2005 |
| JP | 2005-157458 A | | 6/2005 |
| JP | 2016-224690 A | | 12/2016 |
| JP | 2017-163292 A | | 9/2017 |
| JP | 2018007229 A | | 1/2018 |
| JP | 2018-121188 A | | 8/2018 |

* cited by examiner

*Primary Examiner* — Neil R McLean
(74) *Attorney, Agent, or Firm* — Canon U.S.A., Inc. I.P. Division

(57) ABSTRACT

An information processing system according to an exemplary embodiment of the present invention includes an image forming apparatus and an information processing apparatus. The information processing apparatus includes a first setting unit configured to set information about a screen indicating work desired to be performed by a user, a second setting unit configured to set, before the work performed by the user is completed, processing to be performed after the work, and a transmission unit configured to transmit an instruction for displaying the screen and another instruction for causing the processing to be performed. The image forming apparatus includes a display control unit configured to display the screen on a display unit based on the instruction, and a control unit configured to perform the processing based on the other instruction upon completion of the work.

18 Claims, 20 Drawing Sheets

👤 ADMINISTRATOR | 🖼 PERSONAL SETTINGS | ☰ MENU

< PAPER SETTINGS >

*902* — 🅰 A4
*903* — 🅰 A4

SET — *904*
☐ CUSTOM SIZE
☐ ENVELOPE
☐ POSTCARD

▫ DETAILS OF SELECTED PAPER
*905* ▷ ☐ A4
　　PLAIN 1 (64 - 75 g/m²)

OK — *906*

ID SYSTEM MANAGEMENT MODE | ▶ LOG OUT

👤 ADMINISTRATOR | 🖼 PERSONAL SETTINGS | ☰ MENU

< PAPER SETTINGS: PAPER TYPE >
SELECT PAPER TYPE

| THIN 2 (52 - 59 g/m²) | THIN 1 (60 - 63 g/m²) | PLAIN 1 (64 - 75 g/m²) | PLAIN 2 (76 - 90 g/m²) |
| PLAIN 3 (91 - 105 g/m²) | THICK 1 (106 - 128 g/m²) | THICK 2 (129 - 150 g/m²) | THICK 3 (151 - 163 g/m²) |
| THICK 4 (164 - 180 g/m²) | THICK 5 (181 - 220 g/m²) | THICK 6 (221 - 256 g/m²) | |
| RECYCLED 1 (64 - 75 g/m²) | PRE-PUNCHED 1 (64 - 75 g/m²) | OHP FILM | |
| INDEX 1 (91 - 105 g/m²) | INDEX 2 (106 - 128 g/m²) | COLOR 1 (64 - 75 g/m²) | |

*908*

*910* — ☐ TO DETAILED SETTINGS

*911* — ✕ CANCEL　　　　OK — *912*

ID SYSTEM MANAGEMENT MODE | ▶ LOG OUT

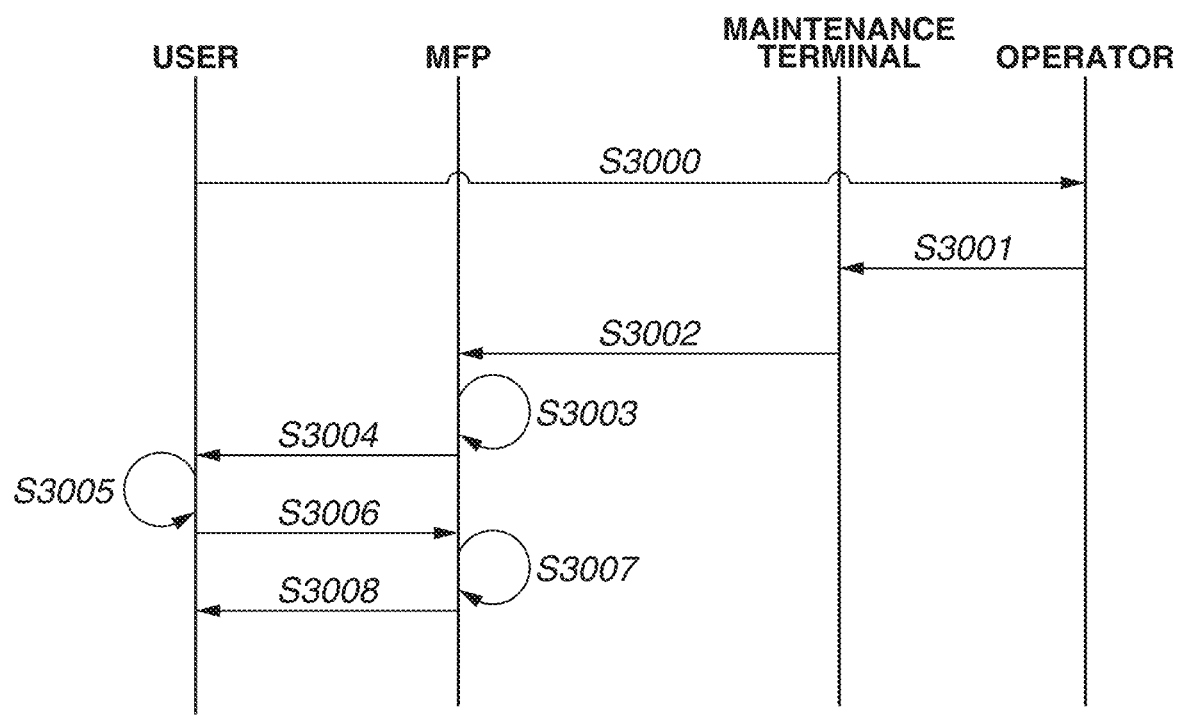

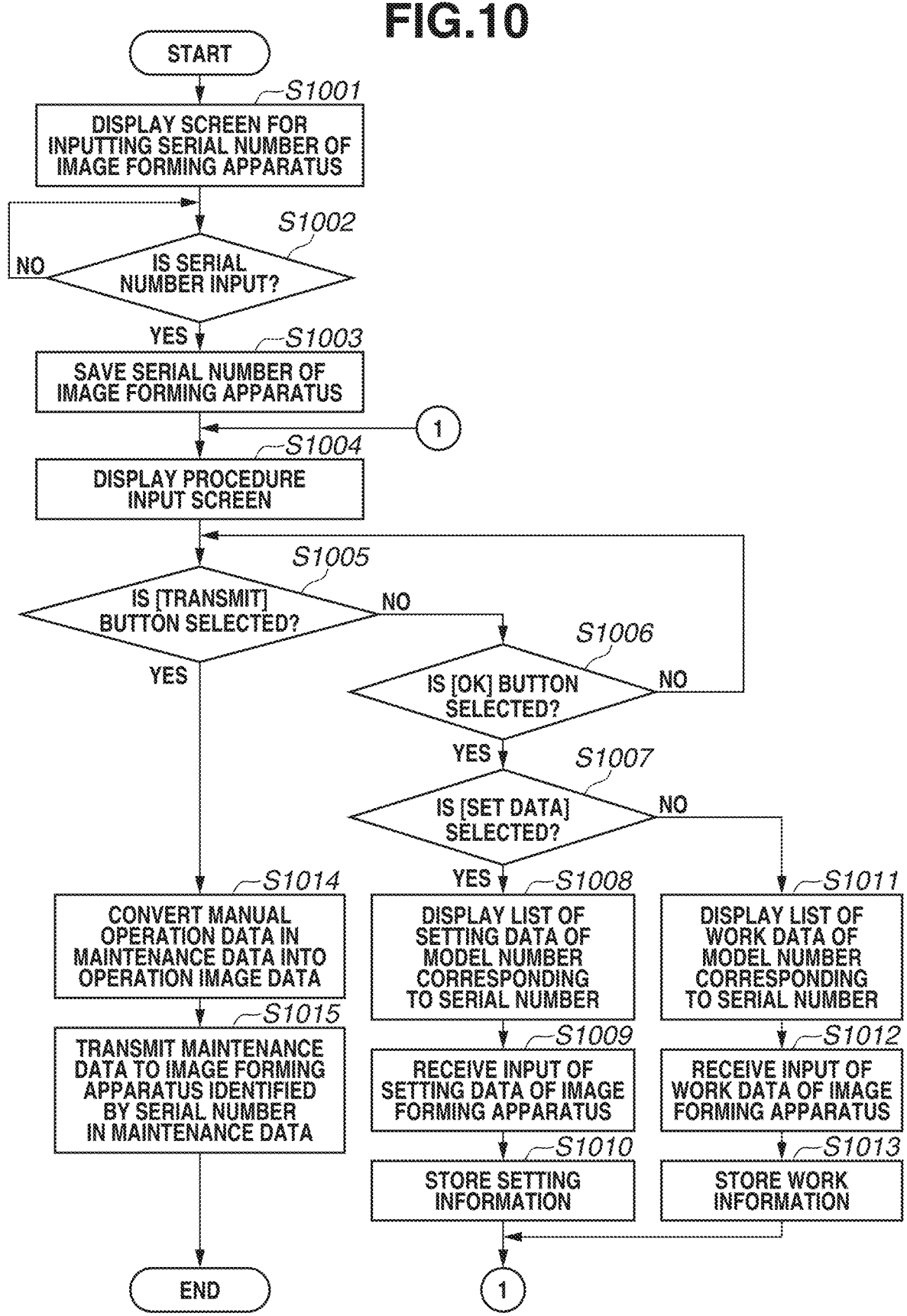

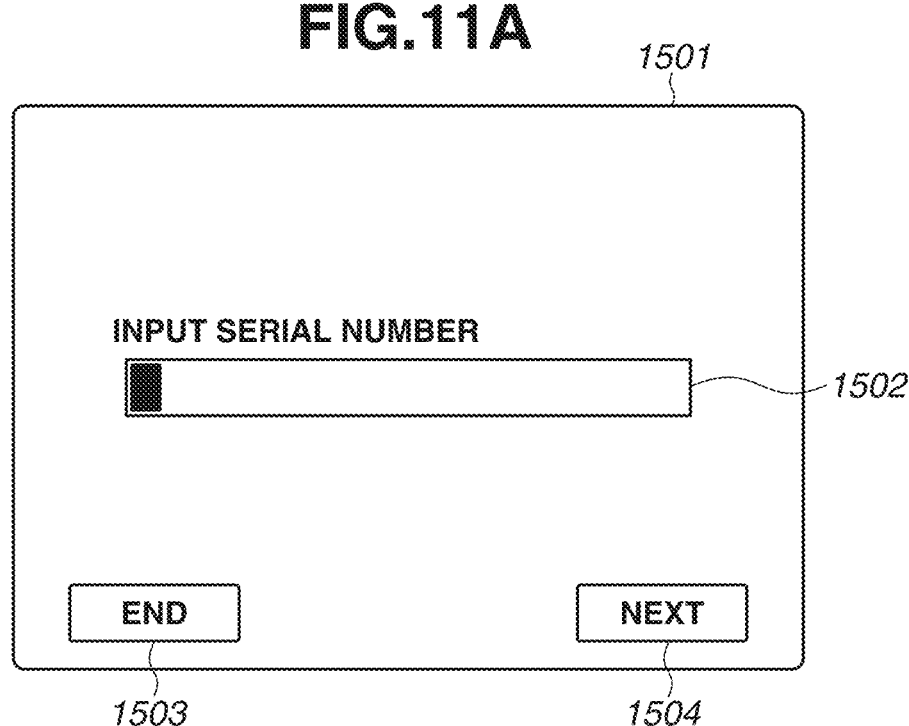
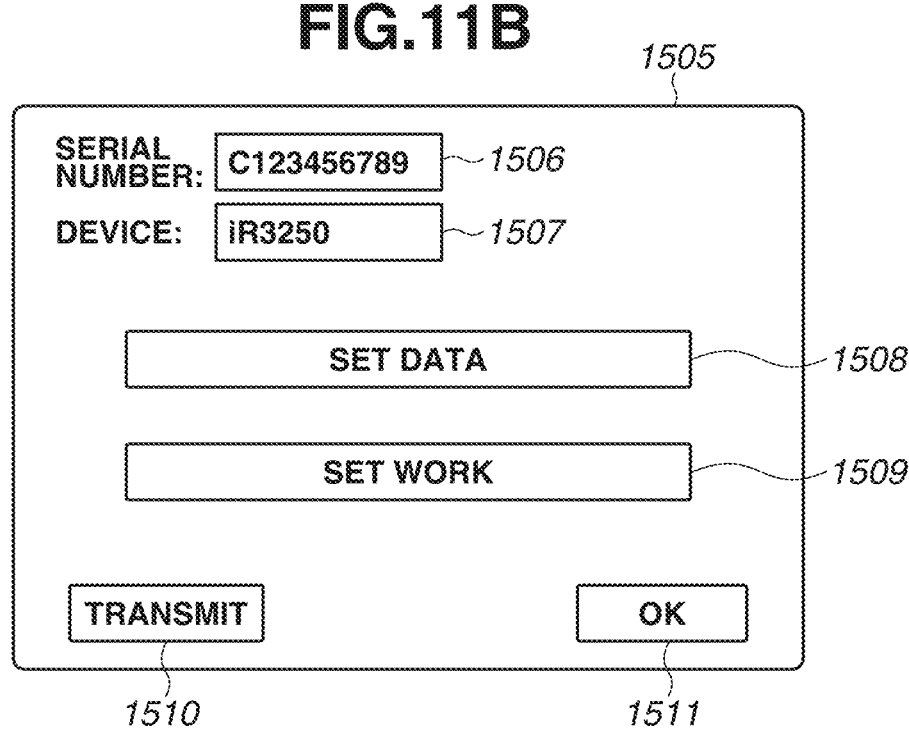

FIG.12

| SERIAL NUMBER | DEVICE TYPE | IP ADDRESS |
|---|---|---|
| C123456789 | iR 3250 | 192.168.123.10 |
| B00010022 | iR 3225 | 192.168.145.11 |
| C10002222 | iRC 3244 | 192.168.123.77 |
| ⋮ | | |
| B10004567 | iR 3250 | 192.168.123.88 |

FIG.18A

| DEVICE TYPE | WORK PORTION INFORMATION | IMAGE FILE |
|---|---|---|
| iR3250 | 1000/1001/0001 | ir3250_scanner_platen_set.jpg |
| | 1000/1001/0002 | ir3250_scanner_platen_remove.jpg |
| | 1000/1002/0001 | ir3250_scanner_adf_set.jpg |
| | 1000/1002/0002 | ir3250_scanner_adf_remove.jpg |
| | 2000/2002/0001 | ir3250_printer_casette1_paper_set.jpg |
| | ... | ... |
| | 2000/2004/0001 | ir3250_printer_casette3_paper_set.jpg |
| | 2000/2001/0001 | ir3250_printer_multitray_paper_set.jpg |
| | 2000/2011/0002 | ir3250_printer_tonner_y_set.jpg |
| | ... | ... |
| | 2000/2014/0002 | ir3250_printer_tonner_k_set.jpg |
| | 2000/2015/0003 | ir3250_printer_waste_tonner_remove.jpg |
| iR3225 | 1000/1001/0001 | ir3225_scanner_platen_set.jpg |
| | 1000/1001/0002 | ir3225_scanner_platen_remove.jpg |
| | 1000/1002/0001 | ir3225_scanner_adf_set.jpg |
| | 1000/1002/0002 | ir3225_scanner_adf_remove.jpg |
| | 2000/2002/0001 | ir3225_printer_casette1_paper_set.jpg |
| | ... | ... |
| | 2000/2002/0001 | ir3225_printer_casette4_paper_set.jpg |
| | 2000/2001/0001 | ir3225_printer_multitray_paper_set.jpg |
| | 2000/2011/0002 | ir3225_printer_tonner_y_set.jpg |
| | ... | ... |
| | 2000/2014/0002 | ir3225_printer_tonner_k_set.jpg |
| | 2000/2015/0003 | ir3225_printer_waste_tonner_remove.jpg |

FIG.18B

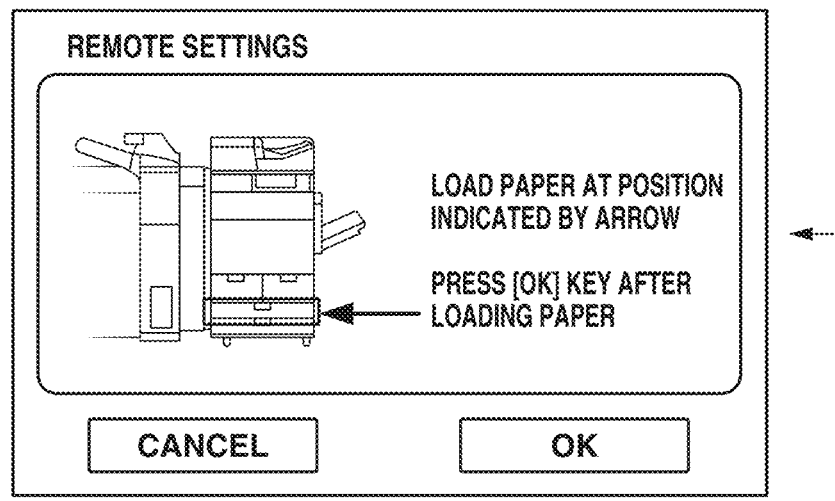

REMOTE SETTINGS

LOAD PAPER AT POSITION INDICATED BY ARROW

PRESS [OK] KEY AFTER LOADING PAPER

CANCEL    OK

INFORMATION PROCESSING SYSTEM, INFORMATION PROCESSING APPARATUS, AND CONTROL METHOD THEREFOR

CROSS-REFERENCE TO RELATED APPLICATION

This application is a Continuation of U.S. application Ser. No. 16/884,543, filed May 27, 2020, which claims priority from Japanese Patent Application No. 2019-101781, filed May 30, 2019, which are hereby incorporated by reference herein in their entireties.

BACKGROUND OF THE INVENTION

Field of the Invention

The present invention relates to an information processing system, an information processing apparatus, and a control method therefor.

Description of the Related Art

When a user is unsure of how to use or set a multi-function peripheral (MFP), the user makes a phone call to a call center to inquire about it. The user tells an operator in the call center what the user wants to do, and performs an operation according to an instruction from the operator.

In a case where what the user wants to do is complicated or there is a plurality of setting items to be configured by the user, it is undesirably time-consuming if the operator instructs the user about all operations over the phone and the user follows them. Under these circumstances, Japanese Patent Application Laid-Open No. 2017-163292 discusses a system that connects the MFP operated by the user and an information processing apparatus operated by the operator via a network, and allows the operator to remotely operate the MFP by operating the information processing apparatus.

What the user calling the call center wants to do may contain both a setting of the MFP that the operator can configure from a remote location, and manual work that cannot be operated by the operator from the remote location and needs to be operated by the user.

For example, when the user attempts to load new paper into a cassette and adjust an image quality using the paper while employing the method discussed in Japanese Patent Application Laid-Open No. 2017-163292, the case necessitates the following setting by the operator and manual work by the user. First, the operator sets the size of the paper to load into the paper feeding cassette. Then, the operator instructs the user to load the paper into the paper feeding cassette to which the paper size is set over the phone. After the user loads the paper into the paper feeding cassette, the operator sets the type of the paper loaded in the paper feeding cassette, and configures a setting required to print an image for adjusting the image quality and instructs the user to start to print the image.

In this manner, in the case where the required operations include both the setting of the image forming apparatus and the manual work by the user, the operator waits for the completion of the manual work by the user, and then sets the content of the processing to perform after the manual work and instructs the user to start the processing. Thus, a long time is undesirably taken until the operator completes the required setting.

SUMMARY OF THE INVENTION

According to an aspect of the present invention, an information processing system includes an image forming apparatus including a display unit configured to display an image thereon, and an information processing apparatus configured to communicate with the image forming apparatus. The information processing apparatus includes a first setting unit configured to set work desired to be performed by a user operating the image forming apparatus, a second setting unit configured to set, before the work performed by the user is completed, processing to be performed by the image forming apparatus after the work set by the first setting unit, and a transmission unit configured to transmit an instruction for displaying an image indicating the work set by the first setting unit on the display unit, and another instruction for causing the image forming apparatus to perform the processing set by the second setting unit. The image forming apparatus includes a reception unit configured to receive the instruction and the other instruction transmitted from the transmission unit, a display control unit configured to display the image indicating the work set by the first setting unit on the display unit based on the instruction received by the reception unit, and a control unit configured to perform the processing based on the other instruction upon completion of the work by the user.

Further features of the present invention will become apparent from the following description of exemplary embodiments with reference to the attached drawings.

BRIEF DESCRIPTION OF THE DRAWINGS

FIGS. 7A and 7B are diagrams illustrating examples of paper settings screens of the MFP according to the exemplary embodiment.

FIG. 8 is a sequence diagram illustrating an example of processing between the MFP and the maintenance terminal according to the exemplary embodiment.

FIG. 10 is a flowchart illustrating processing of generating maintenance data on the maintenance terminal according to the exemplary embodiment.

FIGS. 11A and 11B are diagrams illustrating examples of a serial number input screen and a maintenance data generation screen, respectively, on the maintenance terminal according to the exemplary embodiment.

FIG. 12 is a diagram illustrating an example of a table of device type information data stored in the maintenance terminal according to the exemplary embodiment.

FIGS. 18A and 18B are diagrams each illustrating an example of a table used in processing of generating image data by the maintenance terminal and content of an image file according to the exemplary embodiment.

DESCRIPTION OF THE EMBODIMENTS

In the following description, a first exemplary embodiment of the present invention will be described with reference to the drawings.

Figure 1:
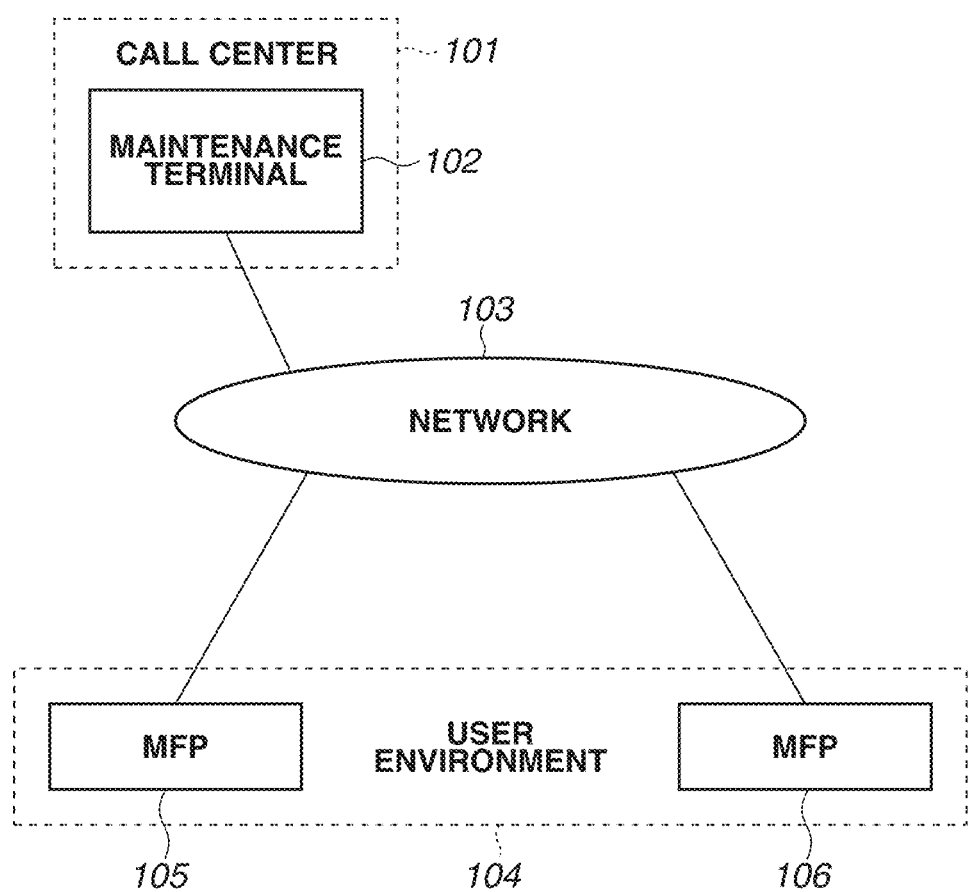
FIG. 1 is a block diagram illustrating an example of an information processing system according to an exemplary embodiment.

FIG. 1 is a diagram illustrating an example of a system configuration of an information processing system capable of providing a maintenance service of a multi-function peripheral (MFP) via a network.

MFPs 105 and 106 are image forming apparatuses installed in a user environment 104 and operated by a user. The MFPs 105 and 106 are connected to a network 103 and can communicate with another MFP and a maintenance terminal 102 in a call center 101.

The maintenance terminal 102 is an information processing apparatus such as a personal computer (PC) installed in the call center 101. The maintenance terminal 102 is operated by an operator in the call center 101. In the present exemplary embodiment, the MFPs 105 and 106 in the user environment 104 are maintained and operated by the maintenance terminal 102 in the call center 101, and setting items thereof are set by using data received from the maintenance terminal 102.

Figure 2:
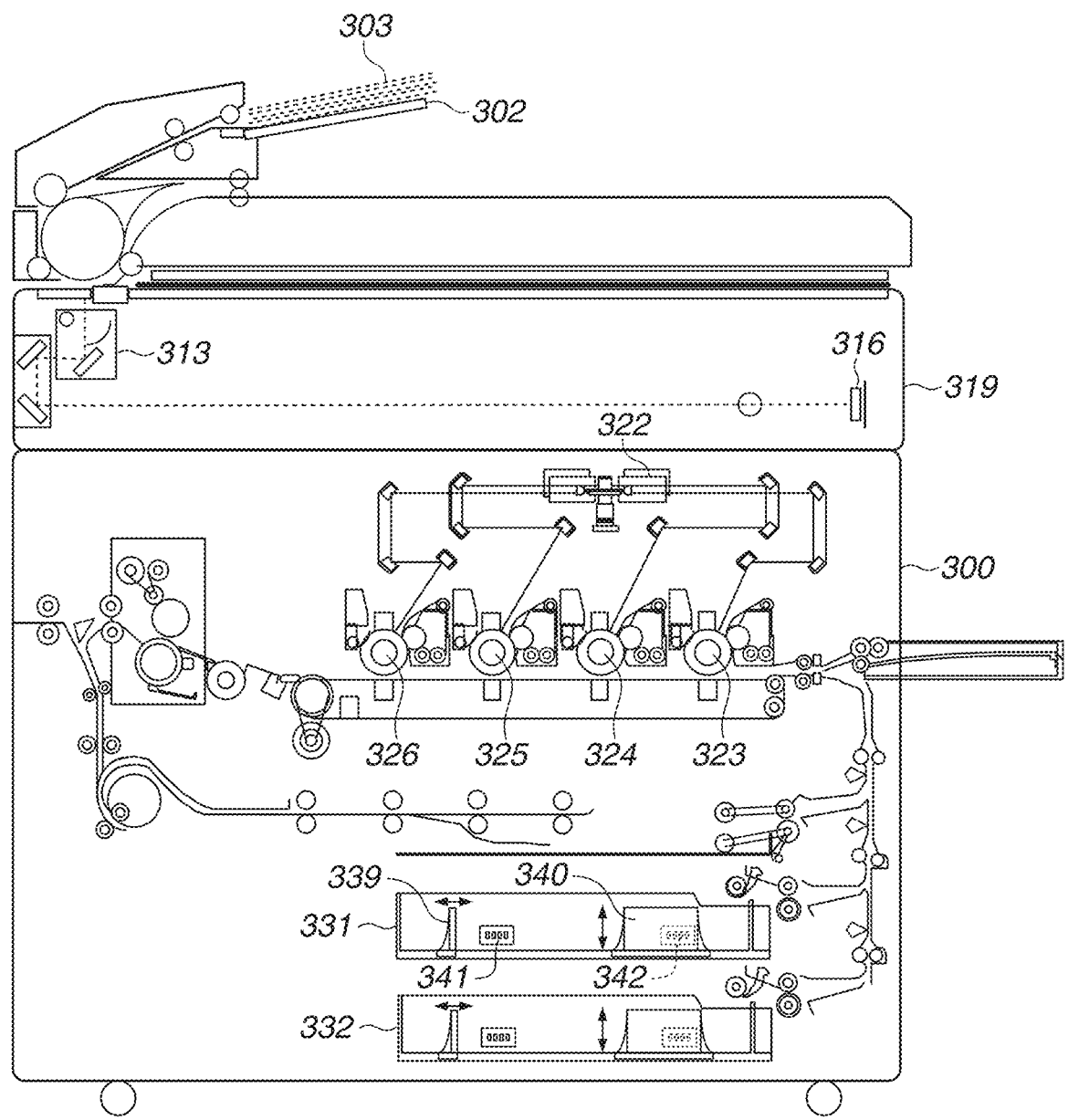
FIG. 2 is a diagram illustrating configurations of a scanner and a printer of a multi-function peripheral (MFP) according to the exemplary embodiment.

FIG. 2 is a diagram illustrating an example of a hardware configuration of the MFP 105. The hardware configuration will be described using the MFP 105 as an example here, but the MFP 106 also has a similar hardware configuration. Further, the information processing system may be constructed using a single function peripheral (SFP) instead of the MFP in the present exemplary embodiment.

The MFP 105 includes a scanner 319 and a printer 300.

The scanner 319 conveys documents 303 on a document tray 302 sheet by sheet. Each of the documents 303 is conveyed to a feeding-reading document glass platen 312, and is exposed by an exposure unit 313. Light to which the document 303 is exposed by the exposure unit 313 is reflected from the document 303, and a result thereof is input to a charge coupled device (CCD) sensor unit 316 and converted into an electric signal.

The printer 300 conveys paper contained in a cassette 331 or 332 and forms an image on the paper. The printer 300 controls a laser unit 322 based on image data, and forms an image on each of photosensitive members 323, 324, 325, and 326 of cyan (C), magenta (M), yellow (Y), and black (K), respectively. The printer 300 transfers and fixes the image formed using each of the colors of toner onto the paper, and discharges the paper to outside the printer 300.

A paper length guide 339 is a guide set to match the paper length of the paper contained in the cassette 331. A paper length switch 341 is used to detect the position of the paper length guide 339 and to detect the paper length size. A paper width guide 340 is a guide set to match the width of the paper contained in the cassette 331. A paper width switch 342 is used to detect the position of the paper width guide 340 and to detect the paper width.

Figure 3:
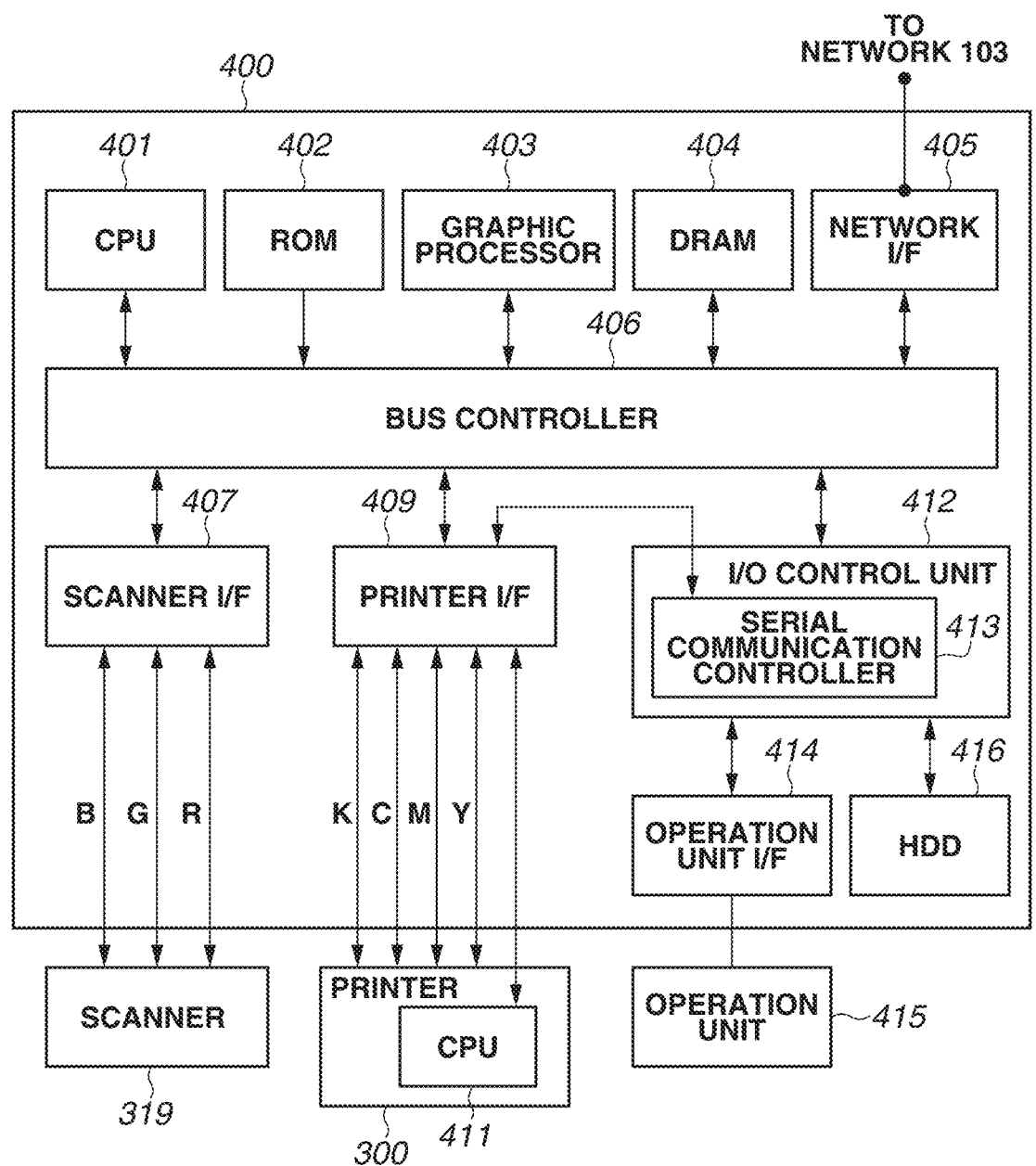
FIG. 3 is a block diagram illustrating a configuration of the MFP according to the exemplary embodiment.

Next, FIG. 3 is a block diagram illustrating hardware of the MFP 105. The MFP 106 is configured similarly to the MFP 105.

A control unit 400 including a central processing unit (CPU) 401 controls operation of the overall MFP 105. The CPU 401 reads out a control program stored in a read only memory (ROM) 402 and performs various kinds of control such as control of a reading device and transmission. A dynamic random access memory (DRAM) 404 is used as a temporarily storage area, such as a main memory and a work area of the CPU 401.

A hard disk drive (HDD) 416 is a nonvolatile memory connected to the control unit 400 via an input/output (I/O) control unit 412. The HDD 416 stores image data temporarily saved in the DRAM 404 under the control by the CPU 401. An operation unit interface (I/F) 414 connects an operation unit 415 and the control unit 400 to each other.

The operation unit 415 includes a liquid crystal display (LCD) panel having a touch panel function, a numeric keypad, and various kinds of buttons. The user inputs various kinds of settings by operating the operation unit 415.

A printer I/F 409 connects the printer 300 and the control unit 400 to each other. A CPU 411 in the printer 300 communicates with the HDD 416 and the CPU 401 via the printer I/F 409 and the I/O control unit 412 including a serial communication controller 413.

Image data to be printed by the printer 300 is transferred from the control unit 400 via the printer I/F 409, and is printed on a recording medium by the printer 300.

A scanner I/F 407 connects the scanner 319 and the control unit 400 to each other. The scanner 319 reads out an image on the document 303 to generate image data (image file), and inputs the image data to the control unit 400 via the scanner I/F 407.

The MFP 105 can transmit the image data (image file) generated by the scanner 319 by file transmission or by an e-mail. A network I/F 405 connects the control unit 400 to the network 103.

A graphic processor 403 performs, on the image data temporarily saved in the DRAM 404, a color space conversion such as a conversion from the red, green, and blue (RGB) color space to the Cyan, Magenta, Yellow, and Black (CMYK) color space, scaling processing, and layout processing of combining a plurality of pieces of image data saved in the DRAM 404.

Figure 4:
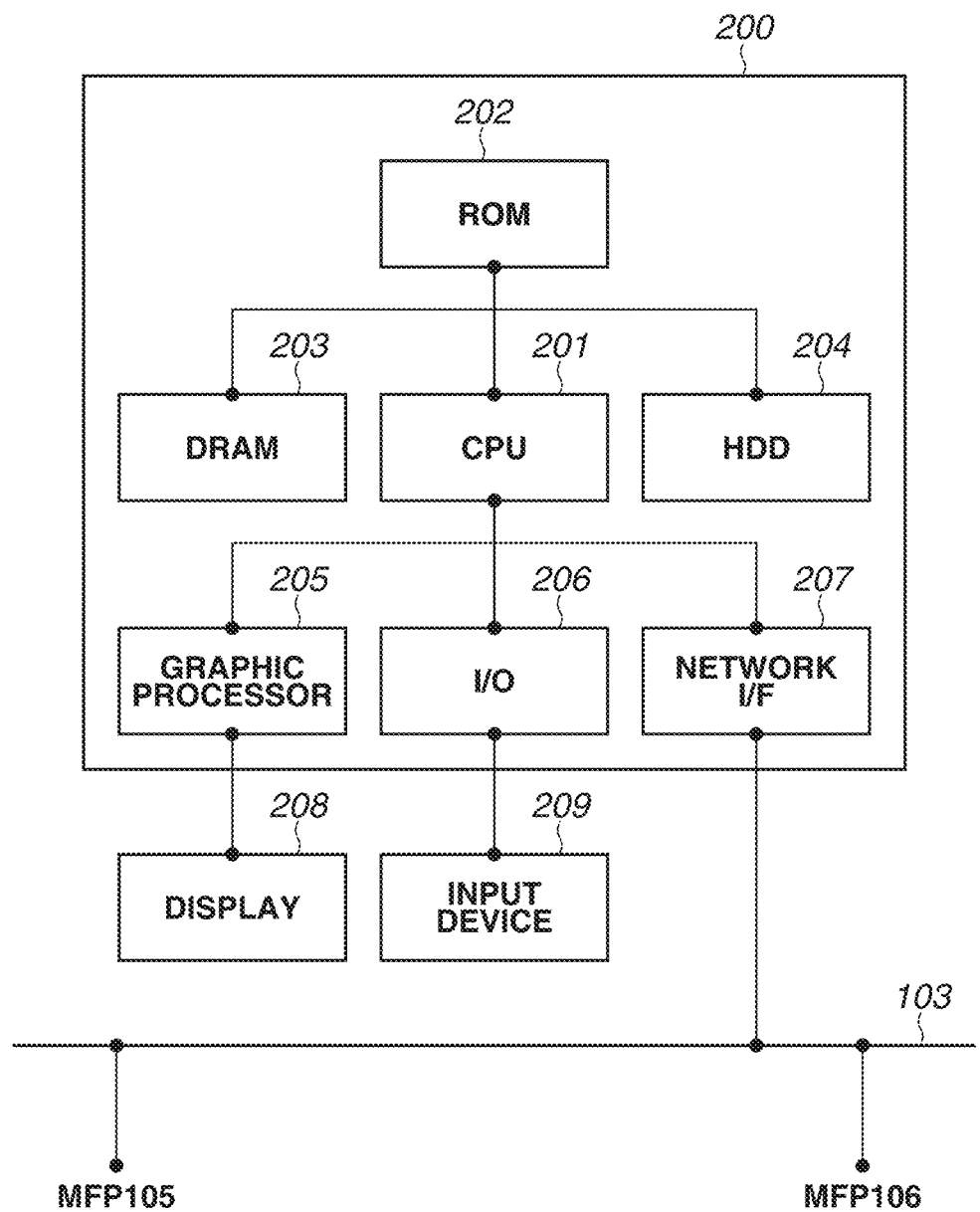
FIG. 4 is a block diagram illustrating a configuration of a maintenance terminal according to the exemplary embodiment.

FIG. 4 is a block diagram illustrating a hardware configuration of the maintenance terminal 102.

The maintenance terminal 102 includes a computer 200, a display 208 that displays an image thereon, and an input device 209 for entering an input into the computer 200. The input device 209 is a device such as a keyboard and a mouse.

In the present exemplary embodiment, the computer 200, the display 208, and the input device 209 will be collectively referred to as the information processing apparatus. The information processing apparatus may be an apparatus in which the computer 200, the display 208, and the input device 209 are integrated.

The computer 200 includes a CPU 201, a ROM 202, a DRAM 203, a HDD 204 that is a large-capacity storage area, a graphic processor 205, an I/O 206 that is an input/output circuit, and a network I/F 207.

The CPU 201 transfers a general-purpose control program stored in the HDD 204 to the DRAM 203 based on a basic control program stored in the ROM 202, and operates based on the transferred general-purpose control program.

The DRAM 203 is used as a work area of the CPU 201, and is used as an area for temporarily saving information from the I/O 206 and transmission and reception data to and from the network I/F 207, and a work area of the graphic processor 205. Further, the HDD 204 is used as an area for storing the image data and a program for maintenance.

The maintenance terminal 102 is connected to the network 103 via the network I/F 207, and is connected to the MFPs 105 and 106.

Now, with reference to FIGS. 5, 6, and 7A and 7B, an operation required for the user to register, in the MFP 105, information about paper to newly use by operating the MFP 105 in the present exemplary embodiment will be described.

To use the new paper on the MFP 105, it is necessary to set a paper size and a paper type of the paper to enable a fixing unit, a photosensitive drum, a conveyance roller, and a development unit of the MFP 105 to operate with settings appropriate for the kind of the paper. Conventionally, the user has configured the setting of the paper size and the paper type of the paper using the following procedure.

Figure 5:
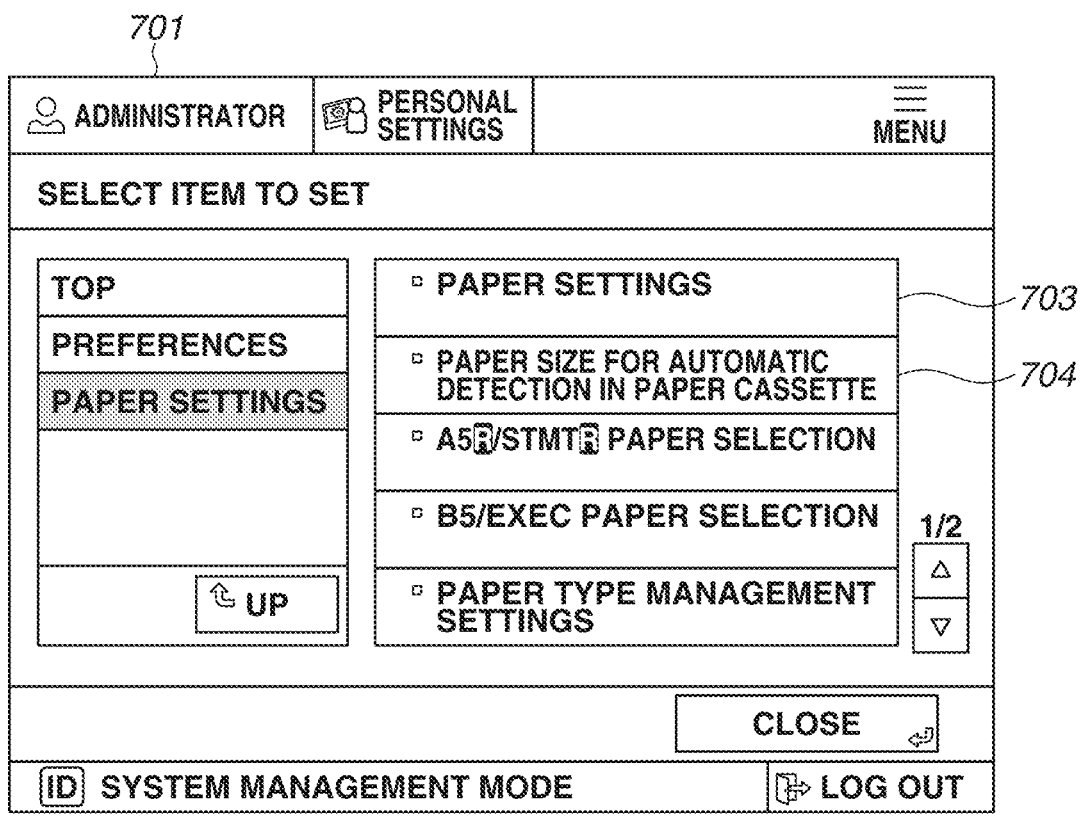
FIG. 5 is a diagram illustrating an example of a screen when paper information is set by operating the MFP according to the exemplary embodiment.

When the user presses a not-illustrated setting key provided on the operation unit 415, a selection screen indicating a plurality of setting items is displayed on a LCD panel of the operation unit 415. When the user selects "PREFERENCES" on the selection screen, a setting menu screen 701 illustrated in FIG. 5 is displayed on the LCD panel of the operation unit 415.

The user selects "PAPER SIZE FOR AUTOMATIC DETECTION IN PAPER CASSETTE" 704 on the setting menu screen 701, and configures a setting regarding detection of the paper size of one of the cassettes 331 and 332 into which the user intends to load the new paper.

Figure 6:
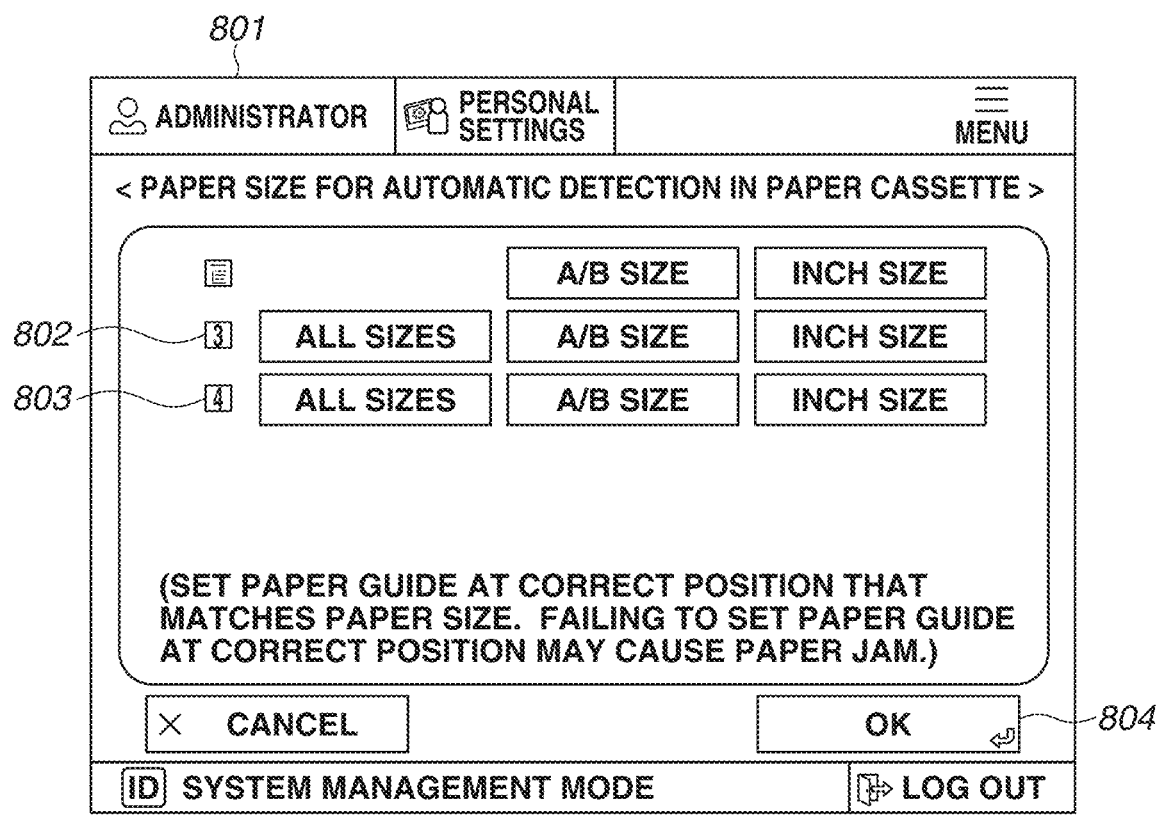
FIG. 6 is a diagram illustrating an example of a setting screen when a paper size used for automatic detection of paper on the MFP is set according to the exemplary embodiment.

When the user selects "PAPER SIZE FOR AUTOMATIC DETECTION IN PAPER CASSETTE" 704, a detection size setting screen 801 illustrated in FIG. 6 is displayed on the display of the operation unit 415. The user sets the paper size used in the detection with respect to the cassette to use on the detection size setting screen 801. An item 802 is a setting item corresponding to the cassette 331, and the user can select whether to detect the paper size of the paper loaded in the cassette 331 in terms of an A/B size or an inch size. An item 803 is a setting item corresponding to the cassette 332, and the user can select whether to detect the paper size of the paper loaded in the cassette 332 in terms of an A/B size or an inch size.

After setting the size information of the cassette into which the user intends to load the paper, the user selects an "OK" button 804.

After selecting the "OK" button 804, the user opens the cassette to which the paper size for automatic detection is set, loads the paper to use in printing, and then closes the cassette. Upon closing of the cassette by the user, the MFP 105 detects the paper size based on outputs from the paper length switch 341 and the paper width switch 342, and stores the detected paper size and the cassette into the DRAM 404 in association with each other. With this operation, the setting of the paper size of the paper loaded into the cassette is completed.

Next, the user sets "PAPER SETTINGS" 703, and sets the type of the paper loaded into the cassette. When the user selects "PAPER SETTINGS" 703, a paper setting screen 901 illustrated in FIG. 7A is displayed on the LCD panel of the operation unit 415. The paper setting screen 901 is a screen on which types of paper usable in the present cassette are displayed in a list form, and is a screen used by the user to select the type of the paper loaded into the present cassette from among the displayed paper types.

A button 902 is a button for displaying the type of the paper loaded into the cassette 331 on the paper setting screen 901. When the button 902 is selected, the paper size and the paper type currently set to the cassette 331 are displayed in a region 905. A button 903 is a button for displaying the type of the paper loaded into the cassette 332. A "SET" button 904 is a button for setting the type of the paper loaded into the currently selected cassette. When the user selects the "SET" button 904, a paper selection screen 907 illustrated in FIG. 7B is displayed on the LCD panel. An "OK" button 906 is a button for ending the setting of the paper on the paper setting screen 901. When the user selects the "OK" button 906, the setting menu screen 701 is displayed on the LCD panel of the operation unit 415.

The paper selection screen 907 is a screen for selecting the type of the paper loaded into the currently selected cassette. A plurality of buttons for selecting the type of the paper to use, from among paper types with paper information thereof registered in advance, is displayed in a region 908. The user selects a button corresponding to the paper loaded in the present cassette from among the buttons displayed in the region 908, and selects an "OK" button 912. When the user selects the "OK" button 912, information indicating the cassette and information indicating the type of the paper are stored into the DRAM 404 in association with each other. Then, the paper setting screen 901 is displayed on the LCD panel of the operation unit 415.

When the user selects a "TO DETAILED SETTINGS" button 910 after selecting the button from the region 908, a not-illustrated screen for changing settings of the button selected from the region 908 is displayed. The user can set the name and the basis weight of the paper regarding each of the buttons displayed in the region 908 via the not-illustrated screen. The user becomes able to use the new paper for printing by performing the above-described operation. The setting of the cassette into which the paper is loaded and the setting of the paper loaded into the cassette have been described above in the present example. The user needs to perform a further operation in a case where the user wants to check or adjust an image quality of printing using the paper to newly use after completing the setting of the paper.

As described above, a plurality of settings is necessary when the new paper is used, and configuring the settings takes time and effort of the user. If an operator teaches all the operations on the phone and the user configures the settings by operating the MFP while talking with the operator on the phone, a heavier load is imposed on the user. Thus, in the present exemplary embodiment, the operator generates maintenance data by operating the maintenance terminal 102, and the MFP 105 configures the setting and displays a screen indicating required work based on the maintenance data, thereby saving the time and effort of the user.

Now, an outline of a flow of processing performed by the user, the MFP 105, the maintenance terminal 102, and the operator according to the present exemplary embodiment will be described with reference to FIG. 8.

First, in step S3000, the user makes a phone call to the operator in the call center 101, and tells the operator the content of the setting or the maintenance that the user wants to achieve from now. The present processing is described as being started by the user calling the operator in the present exemplary embodiment. However, the contact method is not limited to the telephone call and may also be a message exchanged with the operator using an application for the maintenance service. Another method may be the following. When the user starts up the application for the maintenance service on the MFP 105, a screen for selecting an item that the user wants to set is displayed. When the user selects the item, the operator in the call center 101 is notified of the information.

The operator checks with the user the information regarding the MFP 105 and the content of the setting or the maintenance that the user wants to achieve by using the MFP 105. For example, the operator asks the user about the content of the setting or the maintenance that the user wants to achieve, such as whether the user wants to perform printing using new paper, to replace toner, or to clear a jam.

In step S3001, the operator generates setting information required to achieve the setting or the maintenance that the user wants to apply to the MFP 105 by operating the maintenance terminal 102. For example, if the user wants to use new paper, the operator generates, on the maintenance terminal 102, setting information for configuring the setting regarding the automatic detection of the paper size, work information prompting the user to load the paper into the cassette, and setting information for setting the type of the paper.

In step S3002, the operator transmits the generated setting information and work information to the MFP 105 by operating the maintenance terminal 102.

Figure 9:
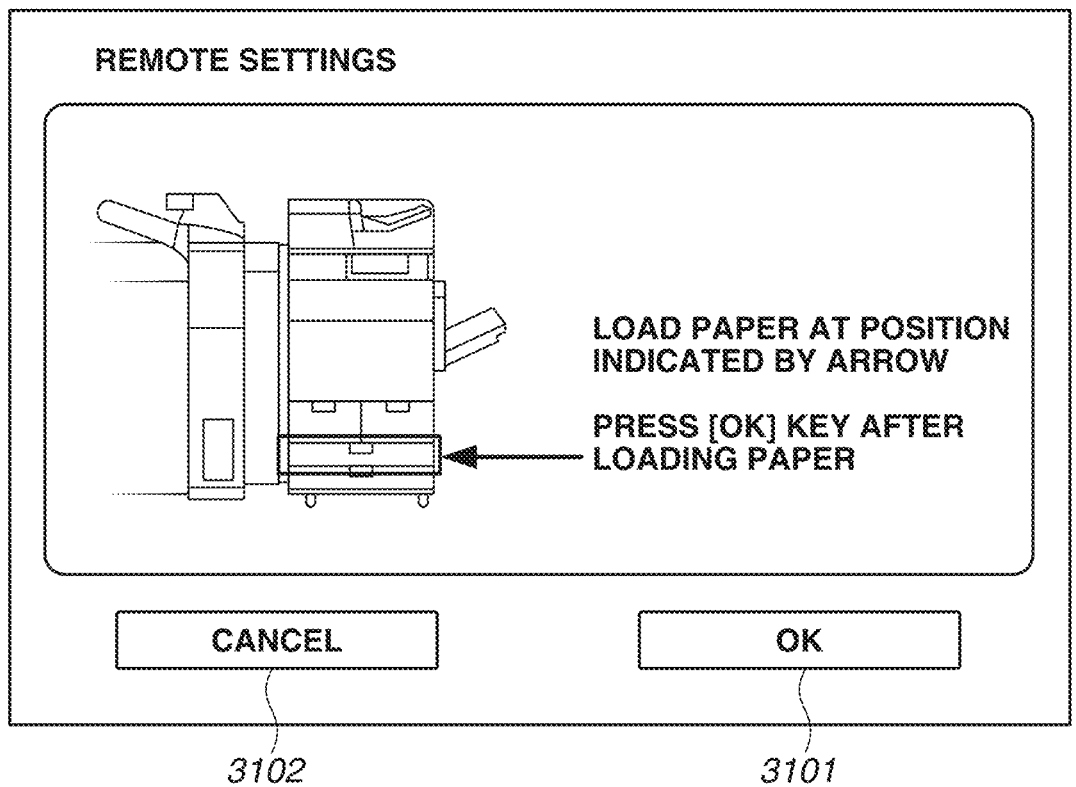
FIG. 9 is a diagram illustrating an example of a work screen displayed on a display of an operation unit of the MFP according to the exemplary embodiment.

In step S3003, the MFP 105 analyzes the received data and configures the setting based on the setting information generated by the maintenance terminal 102. Then, in step S3004, the MFP 105 displays a screen indicating the work required of the user on the LCD panel of the operation unit 415 based on the work information in the data received from the maintenance terminal 102. For example, the MFP 105 displays a work screen indicating the work that the operator wants the user to perform as illustrated in FIG. 9 on the LCD panel of the operation unit 415 based on the work information received from the maintenance terminal 102. In step S3005, the user checks the screen displayed on the LCD panel of the operation unit 415 and performs the work. FIG. 9 illustrates the work screen indicating the work that the user performs. An "OK" button 3101 is a button used by the user to notify the MFP 105 of the completion of the work. A "CANCEL" button 3102 is a button for canceling the setting processing using the information received from the maintenance terminal 102.

In step S3006, the user selects the "OK" button 3101, thereby notifying the MFP 105 that the user has completed the work by operating the operation unit 415. As a result, the MFP 105 detects that the work by the user is completed. In step S3007, the MFP 105 configures the required setting based on the rest of the setting information after the user has completed the required work. For example, in the above-described example illustrated in FIGS. 5 to 7B, after the new paper is loaded into the cassette, the MFP 105 sets the type of the paper and adjusts the image quality and the printing using the new paper. In this case, in step S3007, the MFP 105 performs work of adjusting the type and the image quality of the paper using the data received from the maintenance terminal 102.

Lastly, in step S3008, the MFP 105 notifies the user that the settings based on the data received from the maintenance terminal 102 have been completed. For example, the MFP 105 displays a screen indicating that the setting processing based on the data received from the maintenance terminal 102 has been completed on the LCD panel of the operation unit 415.

In this manner, in the present exemplary embodiment, the user can achieve the desired setting or clear an error only by telling the operator the setting that the user wants to configure and performing the work based on the work information received from the maintenance terminal 102.

In the description below, processing required to execute the sequence illustrated in FIG. 8 will be described. Processing in which the maintenance terminal 102 generates the setting information and the work information and transmits them to the MFP 105 will be described with reference to a flowchart illustrated in FIG. 10.

The processing illustrated in FIG. 10 is started when the operator instructs the maintenance terminal 102 to start up the maintenance service application using the input device 209 according to the present exemplary embodiment. The processing illustrated in FIG. 10 is implemented by the CPU 201 of the maintenance terminal 102 loading the program for maintenance stored in the HDD 204 into the DRAM 203 and executing it.

In step S1001, the CPU 201 generates a maintenance data generation screen 1501 illustrated in FIG. 11A, and displays the maintenance data generation screen 1501 on the display 208 via the graphic processor 205. The maintenance data generation screen 1501 is a screen including an input region 1502 and prompting the operator to input a serial number serving as identification information for identifying the MFP 105. The operator asks the user about the serial number of the MFP 105 and inputs the serial number into the input region 1502. The maintenance terminal 102 acquires the serial number of the MFP 105 via the maintenance data generation screen 1501 to acquire information regarding a device type and product specifications of the MFP 105. An "END" button 1503 on the maintenance data generation screen 1501 is a button used by the operator to instruct the maintenance terminal 102 to end the generation of the maintenance data.

In step S1002, the CPU 201 determines whether the serial number is received via the maintenance data generation screen 1501. When the operator inputs the serial number into the input region 1502 and selects a "NEXT" button 1504 (YES in step S1002), the CPU 201 advances the process to step S1003. Until the operator selects the "NEXT" button 1504, the CPU 201 repeatedly performs the processing described in step S1002. If the operator selects the "END" button 1503, the CPU 201 ends the processing illustrated in FIG. 10.

In step S1003, the CPU 201 saves the serial number input in the input region 1502 into the DRAM 203. In step S1003, the CPU 201 acquires a device type and an Internet Protocol (IP) address corresponding to the serial number input in the input region 1502 from a table illustrated in FIG. 12 that is stored in the HDD 204, and stores them into the DRAM 203. The IP address acquired at this time is used in the transmission of the maintenance data. FIG. 12 is a diagram schematically illustrating an example of the table stored in the HDD 204. A serial number 1801 indicates the serial number of an MFP that the maintenance terminal 102 can communicate with. A device type 1802 indicates a device model number of the MFP identified by each serial number. An IP address 1803 indicates the IP address corresponding to the MFP identified by each serial number. The table illustrated in FIG. 12 can be stored in a location different from the HDD 204. For example, the table can be stored in a server with which the maintenance terminal 102 can communicate, and the CPU 201 acquires information indicating the device type and the IP address from the server and stores them into the DRAM 203 in step S1003.

In step S1004, the CPU 201 displays a procedure input screen 1505 illustrated in FIG. 11B on the display 208. The serial number input in the input region 1502 on the maintenance data generation screen 1501 is displayed in a serial number region 1506. The device type of the MFP 105 read out in step S1003 is displayed in a device region 1507. A "SET DATA" button 1508 is a button used by the operator to generate the setting information to transmit to the MFP 105. A "SET WORK" button 1509 is a button used by the operator to generate the work information to transmit to the MFP 105. The operator selects either the "SET DATA" button 1508 or the "SET WORK" button 1509. When the operator selects either of the buttons 1508 and 1509, the color of the selected button is highlighted and displayed in a manner indicating that the button is in a selected state. Only one of the "SET DATA" button 1508 and the "SET WORK" button 1509 can be selected, and the operator cannot select both of them at the same time. If the operator selects an "OK" button 1511 while either the "SET DATA" button 1508 or the "SET WORK" button 1509 is selected, a screen for generating the corresponding data to transmit to the MFP 105 is displayed. Even if the "OK" button 1511 is selected while neither the "SET DATA" button 1508 nor the "SET WORK" button 1509 is selected, no change occurs in the display on the display 208 of the maintenance terminal 102. A "TRANSMIT" button 1510 is a button for starting processing of transmitting the setting information and the work information generated by the operator until that time to the MFP 105.

The procedure input screen 1505 may be configured to display shipment destination information set to the MFP 105 and/or information about an optional part connected to the MFP 105, such as a cassette, a paper side deck, or a finisher, and to receive an input thereof although such information is not illustrated in FIG. 11B.

In step S1005, the CPU 201 determines whether the "TRANSMIT" button 1510 is selected. If the "TRANSMIT" button 1510 is selected (YES in step S1005), the CPU 201 performs processing to be described below in and after step S1014. If the "TRANSMIT" button 1510 is not selected (NO in step S1005), in step S1006, the CPU 201 determines whether the "OK" button 1511 is selected. If the "OK" button 1511 is not selected (NO in step S1006), the processing returns to step S1005.

Figure 13:
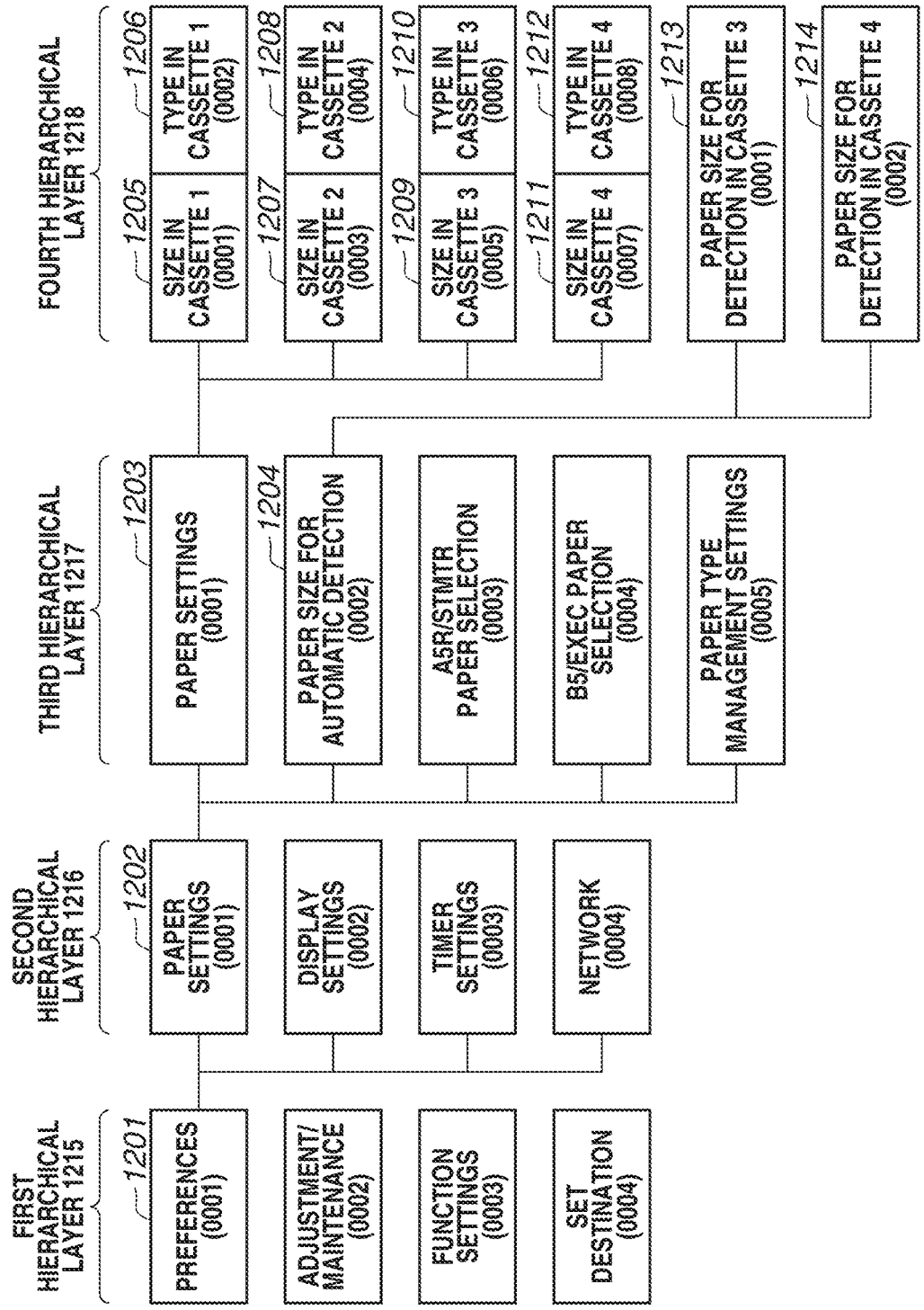
FIG. 13 is a diagram illustrating an example of a data structure of user settings according to the exemplary embodiment.

If the "OK" button 1511 is selected (YES in step S1006), in step S1007, the CPU 201 determines whether the "SET DATA" button 1508 is selected. A state where the "SET DATA" button 1508 is not selected (NO in step S1007) means that the "SET WORK" button 1509 is selected, and the CPU 201 performs processing to be described below in and after step S1011. If the "SET DATA" button 1508 is selected (YES in step S1007), the CPU 201 acquires, from the HDD 204, tree-structured data of setting items corresponding to the device type that is a destination to which the maintenance data will be transmitted, which is illustrated in FIG. 13. Then, in step S1008, the CPU 201 displays, on the display 208, a data setting screen 1601 illustrated in FIG. 14 that is generated based on the tree-structured data.

FIG. 13 is a diagram illustrating an example of the tree-structured data of the setting items corresponding to the MFP 105 of the device type stored into the DRAM 203 in step S1003. In the present exemplary embodiment, the tree structure illustrated in FIG. 13 corresponds to a tree structure of setting screens displayed on the operation unit 415 of the MFP 105. A first hierarchical layer 1215 indicates items displayed when the user presses the not-illustrated setting key for configuring overall apparatus settings of the MFP 105. A second hierarchical layer 1216 indicates items that the user can set with respect to the item selected in the first hierarchical layer 1215. A third hierarchical layer 1217 indicates items that the user can set with respect to the item selected in the second hierarchical layer 1216. A fourth hierarchical layer 1218 indicates items that the user can set with respect to the item selected in the third hierarchical layer 1217. The number written under each of the setting items is information used by the CPU 201 to identify which data is set.

Figure 14:
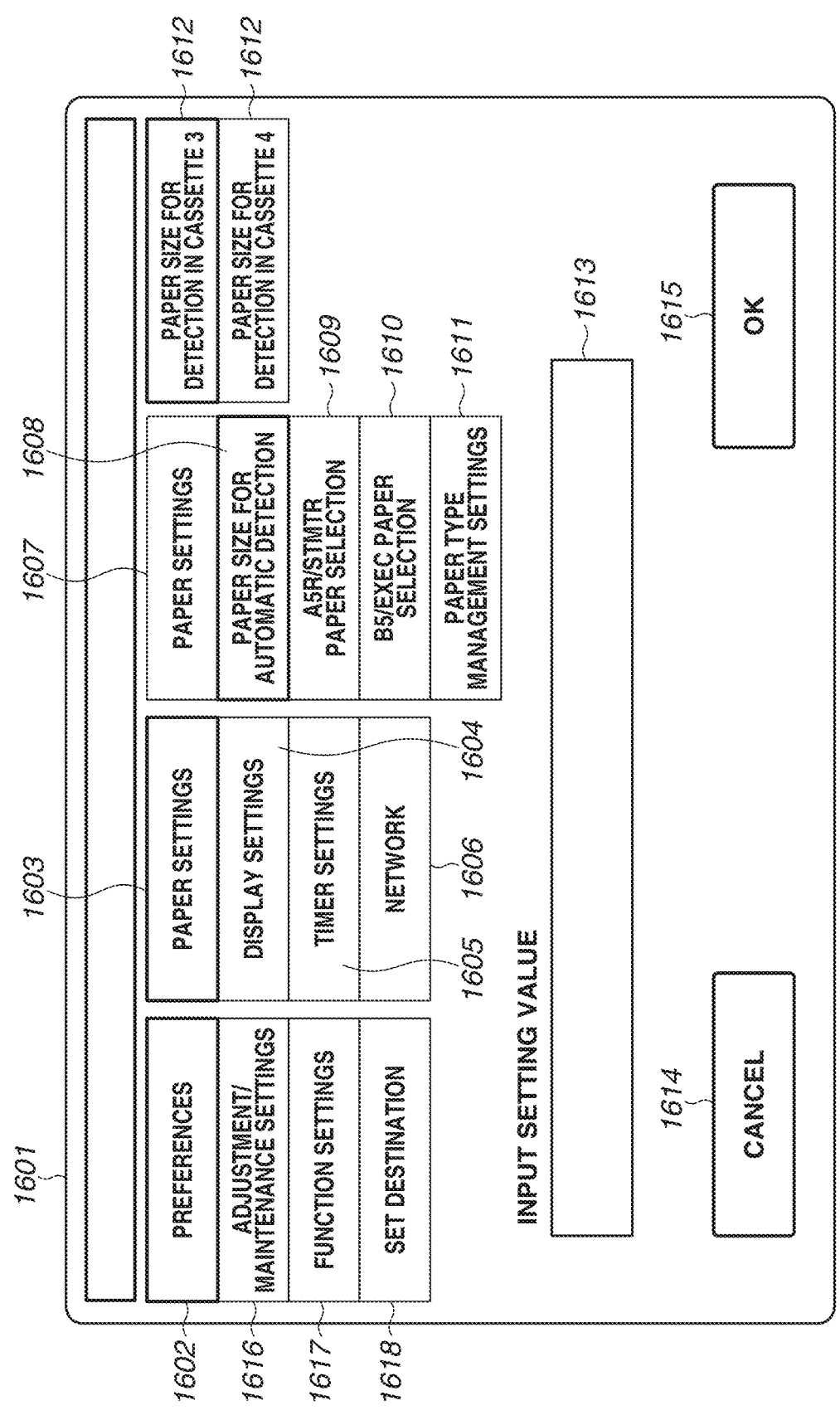
FIG. 14 is a diagram illustrating an example of a data setting screen on the maintenance terminal according to the exemplary embodiment.

FIG. 14 illustrates the data setting screen 1601 generated based on the tree structure illustrated in FIG. 13. When the data setting screen 1601 is displayed, items initially displayed thereon are a "PREFERENCES" button 1602, an "ADJUSTMENT/MAINTENANCE SETTINGS" button 1616, a "FUNCTION SETTINGS" button 1617, and a "SET DESTINATION" button 1618 corresponding to the first hierarchical layer 1215 illustrated in FIG. 13. If the operator selects the "PREFERENCES" button 1602, buttons 1603 to 1606 corresponding to the second hierarchical layer 1216 illustrated in FIG. 13 are displayed. When the operator further selects a button corresponding to an item to set from among the buttons 1603 to 1606, buttons 1607 to 1611 representing the items in the third hierarchical layer 1217 corresponding to the button are displayed. When the operator selects an item to set from among the items in the third hierarchical layer 1217, buttons representing the items corresponding to the fourth hierarchical layer 1218 corresponding to the selected item are displayed. In FIG. 14, items surrounded by thick frames are the items selected by the operator. An input region 1613 is a region where the operator inputs a setting value of the item selected with the above-described button. The data setting screen 1601 illustrated in FIG. 14 is a screen where the operator inputs the setting value in the form of a character string. Alternatively, the data setting screen 1601 may be configured in such a manner that, depending on the item, setting values settable for the item that is set with the button are displayed as buttons, and the operator selects one setting value. An "OK" button 1615 is a button used by the operator to complete the data setting. When the operator selects the "OK" button 1615, the procedure input screen 1505 is displayed on the display 208, and the operator can generate the next setting information or work information. A "CANCEL" button 1614 is a button for discarding the setting set on the data setting screen 1601 and returning to the procedure input screen 1505. If the "CANCEL" button 1614 is selected, the procedure input screen 1505 is displayed without the setting information being generated in correspondence with the setting on the data setting screen 1601. The data setting screen 1601 has been described using a case where the operator selects "PREFERENCES" button 1602 in FIG. 14. If selecting the other items 1616 to 1618, the operator can set the setting or processing corresponding to the selected item for each of them. For example, if selecting the "ADJUSTMENT/ MAINTENANCE SETTINGS" button 1616, the operator can configure settings regarding adjustments of the image quality and the printing position, and an instruction to perform processing for adjusting the image quality and the printing position via the data setting screen 1601.

In step S1009, after displaying the data setting screen 1601, the CPU 201 receives an input of the setting content from the operator. In response to the operator selecting the "OK" button 1615, the CPU 201 advances the process to step S1010. In step S1010, the CPU 201 stores the content set via the data setting screen 1601 into the DRAM 203 and returns the process to step S1004. The setting information for setting one setting item of the MFP 105 is generated by performing the processing described in steps S1008 to S1010. The operator generates as many pieces of setting information as the number of items that the operator wants to set to the MFP 105 by operating the maintenance terminal 102. Processing performed when the "CANCEL" button 1614 is selected on the data setting screen 1601 illustrated in FIG. 14 is omitted in the flowchart illustrated in FIG. 10. If the "CANCEL" button 1614 is selected after step S1009, the CPU 201 discards the value set on the data setting screen 1601, and returns the process to step S1004.

Figure 15:
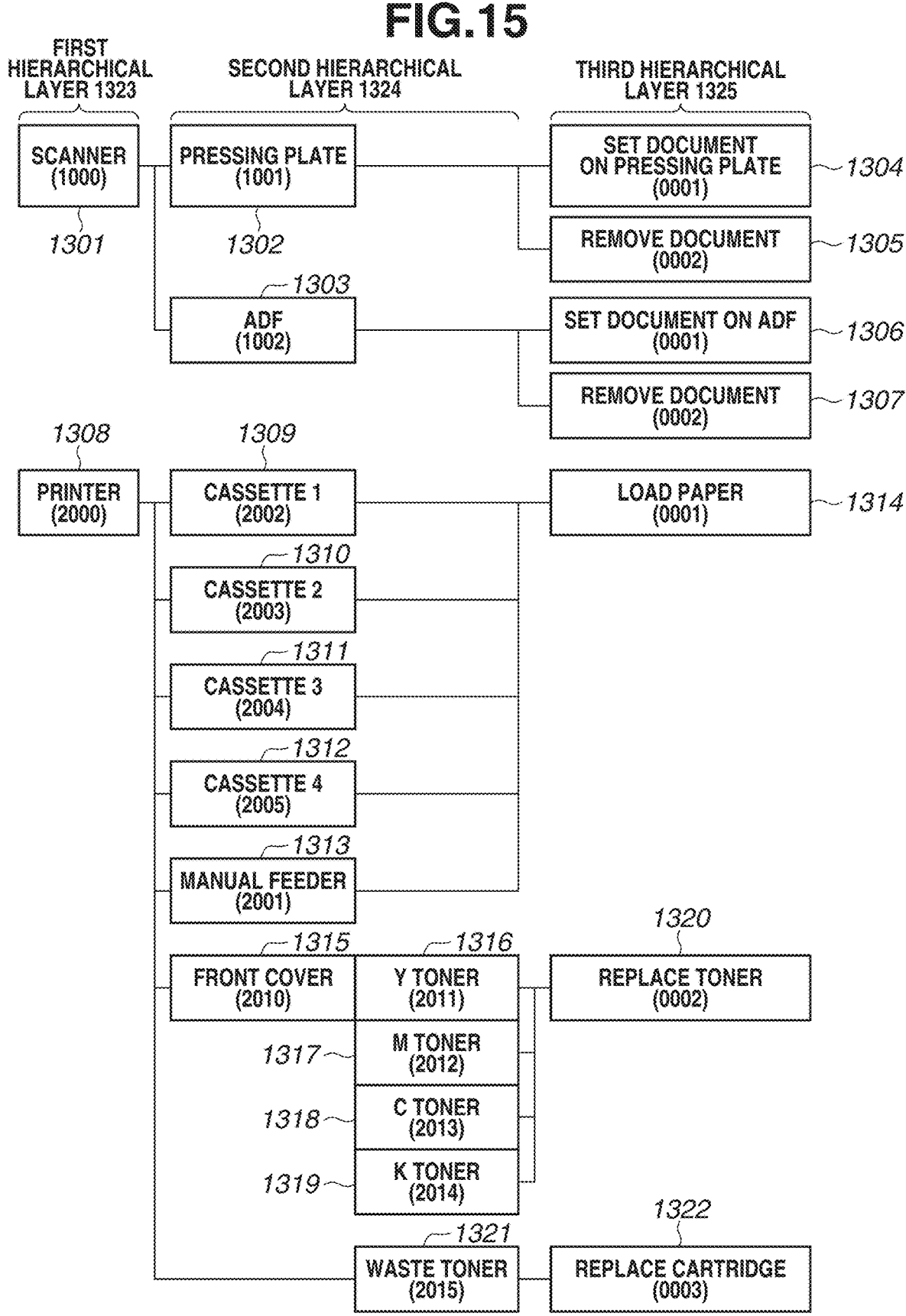
FIG. 15 is a diagram illustrating an example of a hardware configuration of the MFP according to the exemplary embodiment.

Next, the flowchart illustrated in FIG. 10 will be further described using a case where the "SET WORK" button 1509 is selected in step S1007. The CPU 201 acquires, from the HDD 204, hardware configuration information of the MFP 105 corresponding to the device type of the MFP 105 stored in the DRAM 203. The hardware configuration information refers to information expressing the hardware configuration of the MFP 105 in a tree structure illustrated in FIG. 15. In the tree structure indicating the hardware configuration, a first hierarchical layer 1323 stores therein the device targeted for the work. A second hierarchical layer 1324 stores therein information indicating the portion on which the operator wants the user to perform the work with respect to each of the devices. Then, a third hierarchical layer 1325 stores therein information about a message indicating the work that the operator wants the user to perform on each of the portions. For example, if selecting the scanner as the device targeted for the work and selecting a pressing plate as a portion to be worked on, the operator can instruct the user to set a document on the pressing plate as the work that the operator wants the user to perform or to remove the document from the pressing plate as the work. The number assigned to each of the items in FIG. 15 is information used by the CPU 201 to identify each of the items.

Figure 16:
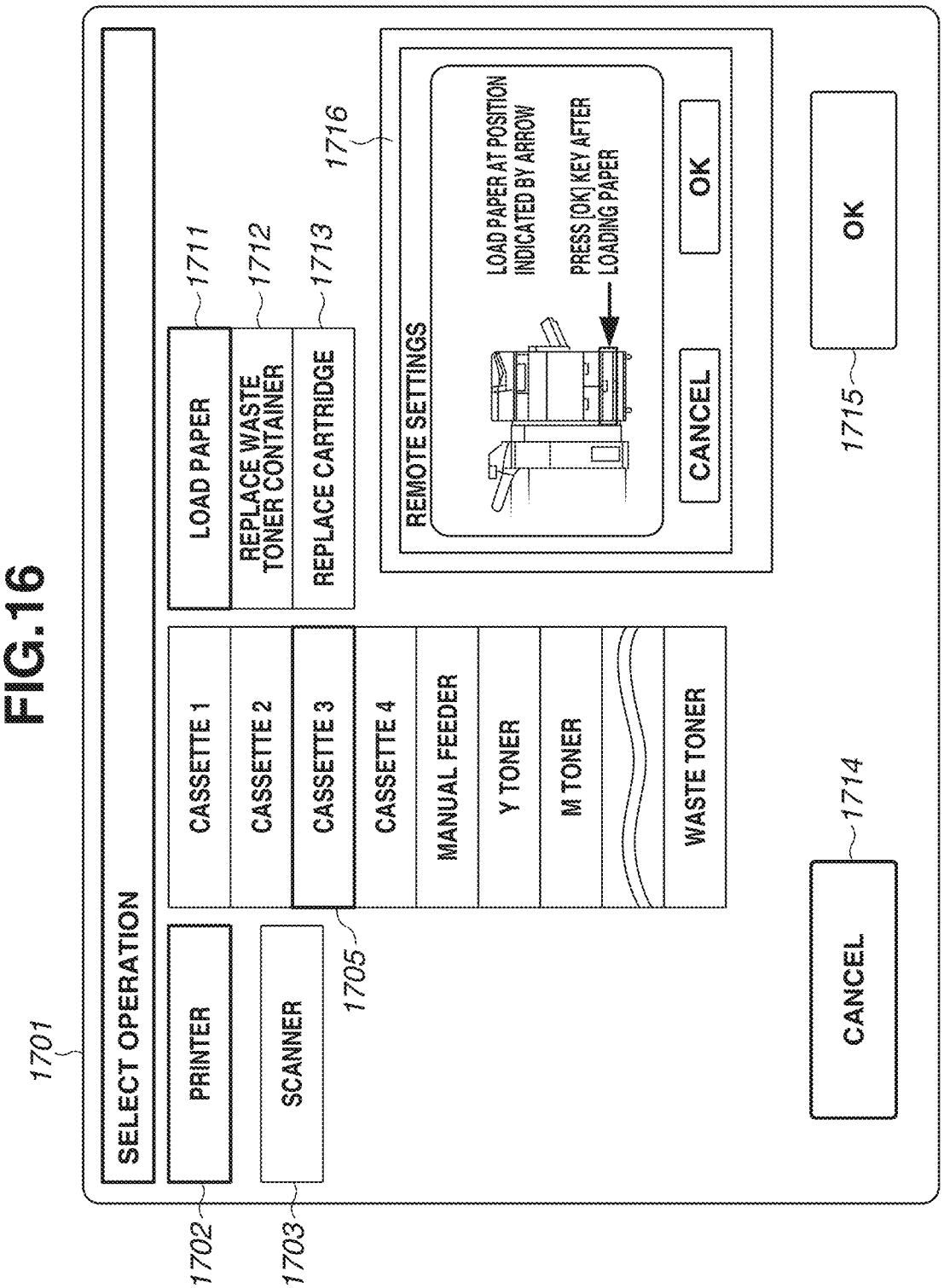
FIG. 16 is a diagram illustrating an example of a work information setting screen on the maintenance terminal according to the exemplary embodiment.

Then, in step S1011, the CPU 201 displays a work setting screen 1701 illustrated in FIG. 16 to be displayed on the display 208 based on the acquired hardware configuration information. When the work setting screen 1701 is displayed, only a "PRINTER" button 1702 and a "SCANNER" button 1703 are displayed at this stage. If the operator selects the "PRINTER" button 1702, a "CASSETTE 1" button to a "WASTE TONER" button placed in the hierarchical layer immediately below "PRINTER" are displayed based on the tree structure illustrated in FIG. 15. If the operator selects a "CASSETTE 3" button 1705, buttons 1711, 1712, and 1713 each for setting a message indicating the work content in the hierarchical layer immediately below "CASSETTE 3" in FIG. 15 are displayed. The button 1711 is a button for displaying a message indicating that the paper should be loaded into the cassette. The button 1712 is a button for displaying a procedure for replacing a waste toner container. The button 1713 is a button for displaying a procedure for replacing a toner cartridge. A preview region 1716 on the work setting screen 1701 illustrated in FIG. 16 is a region displaying a preview image of an image that will be displayed on the LCD panel of the operation unit 415 of the MFP 105 as a result of the setting configured by the operator. The LCD panel of the operation unit 415 of the MFP 105 displays an object indicating the portion on which the operator wants the user to perform the work, and a text indicating the work that the operator wants the user to perform on the portion as illustrated in the preview region 1716. The operator can check the screen that will be displayed on the LCD panel of the MFP 105 by viewing the image displayed in the preview region 1716. FIG. 16 illustrates a screen displayed on the MFP 105 when the operator selects the "PRINTER" button 1702, the "CASSETTE 3" button 1705, and the "LOAD PAPER" button 1711.

In step S1012, the CPU 201 receives the setting of the work information from the operator. When an "OK" button 1715 is selected, in step S1013, the CPU 201 stores the information set via the work setting screen 1701 as the work information into the DRAM 203. Then, the CPU 201 returns the process to step S1004.

The operator repeatedly configures the settings in steps S1004 to S1013, thereby generating the setting information that the operator wants to set to the MFP 105 and the work information indicating the work that the operator wants the user to perform in the course of the setting. Processing performed when the operator selects the "CANCEL" button 1714 on the work setting screen 1701 is omitted in the flowchart illustrated in FIG. 10. If the operator selects the "CANCEL" button 1714 after step S1012, the CPU 201 discards the content set on the work setting screen 1701, and returns the process to step S1004.

Figure 17:
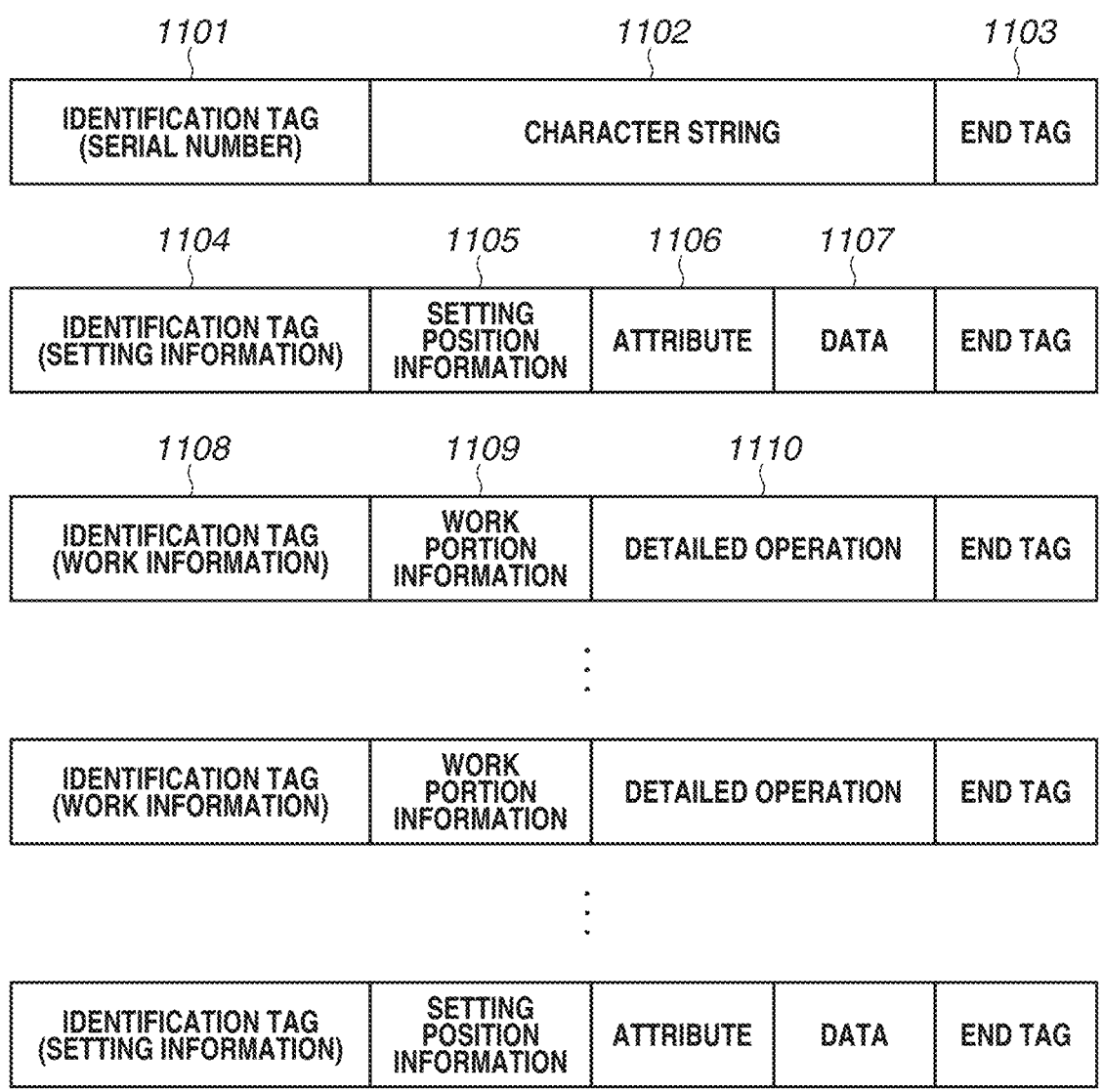
FIG. 17 is a diagram illustrating an example of a structure of the maintenance data on the maintenance terminal according to the exemplary embodiment.

The CPU 201 of the maintenance terminal 102 generates the maintenance data in a data structure illustrated in FIG. 17 by performing the processing in steps S1001 to S1013.

An identification tag (serial number) 1101 is data indicating that a character string 1102 is the serial number of the MFP 105. The character string 1102 is data indicating the serial number of the MFP 105 that is saved in step S1003. An end tag 1103 indicates the end of the data indicated based on the identification tag 1101. The end tag also serves as a tag indicating the end of one data block for the following data.

An identification tag (setting information) 1104 indicates that the pieces of data indicated with 1105 to 1107 described below are the setting information generated in step S1010. The setting position information 1105 is data indicating which item is set in each of the first hierarchical layer 1215 to the fourth hierarchical layer 1218 illustrated in FIG. 13. The attribute 1106 is data indicating an attribute of the data 1107 input in the input region 1613. The attribute is, for example, data indicating a character string or a numerical value. The data 1107 is data indicating the setting value input in the input region 1613 on the data setting screen 1601.

An identification tag (work information) 1108 is data indicating that the pieces of data indicated with 1109 and 1110 described below are the work information generated in step S1013. The work portion information 1109 is data indicating which item is set in each of the first hierarchical layer 1323 and the second hierarchical layer 1324 illustrated in FIG. 15. A detailed operation 1110 is data indicating which item is set in the third hierarchical layer 1325 illustrated in FIG. 15.

The pieces of data illustrated in FIG. 17 are arranged in the order in which the operator has set the setting information and the work information. Arranging the data in this manner allows the operator to set the data using the same procedure as that at the time of configuring the setting and performing the work using the MFP 105. In FIG. 17, the setting information and the work information are arranged in the order in which the operator has set them. Information indicating the order in which the operator has set them may be added to each of the setting information and the work information. Adding the information indicating the order can further clarify the order in which the operator has set them.

If the "TRANSMIT" button 1510 is selected in step S1005 (YES in step S1005), in step S1014, the CPU 201 generates image data to be displayed on the LCD panel of the operation unit 415 of the MFP 105 based on the work information set by the operator. In step S1005, the CPU 201 identifies data having the identification tag indicating the work information from the maintenance data illustrated in FIG. 17. The CPU 201 generates the image data to be displayed on the operation unit 415 of the MFP 105 with respect to the identified work information.

Processing of generating the image data will be described with reference to FIGS. 18A and 18B. A table 1900 is a table stored in the HDD 204. A device type 1901 is the device type of an MFP that can be treated as the destination to which the maintenance data will be transmitted. The CPU 201 selects an image file to use from image files associated with the device type of the MFP 105 treated as the destination to which the maintenance data will be transmitted. Work portion information 1902 is information corresponding to the first hierarchical layer 1323, the second hierarchical layer 1324, and the third hierarchical layer 1325 illustrated in FIG. 15, and includes information for identifying each of the items. For example, information 1905 is the work portion information in a case where the operator selects "PRINTER (2000)", "CASSETTE 3 (2004)", and "LOAD PAPER (0001)" on the work setting screen 1701. An image file 1903 indicates the name of an image file corresponding to each piece of work portion information 1902. For example, an image file corresponding to 1905 is 1906, and the content thereof is an image illustrated in FIG. 18B. The image used to notify the user of the work may be a still image or may be a moving image. Alternatively, the image may be a file including a plurality of still images. In the case where the image includes the plurality of still images, the user displays the images while switching them by operating the operation unit 415 of the MFP 105. In this manner, the user can understand the work procedure in further detail.

In step S1015, the CPU 201 transmits the maintenance data to the MFP 105 corresponding to the serial number input in step S1002. In step S1015, the CPU 201 transmits the maintenance data to the IP address stored in step S1003 as the destination.

Figure 19:
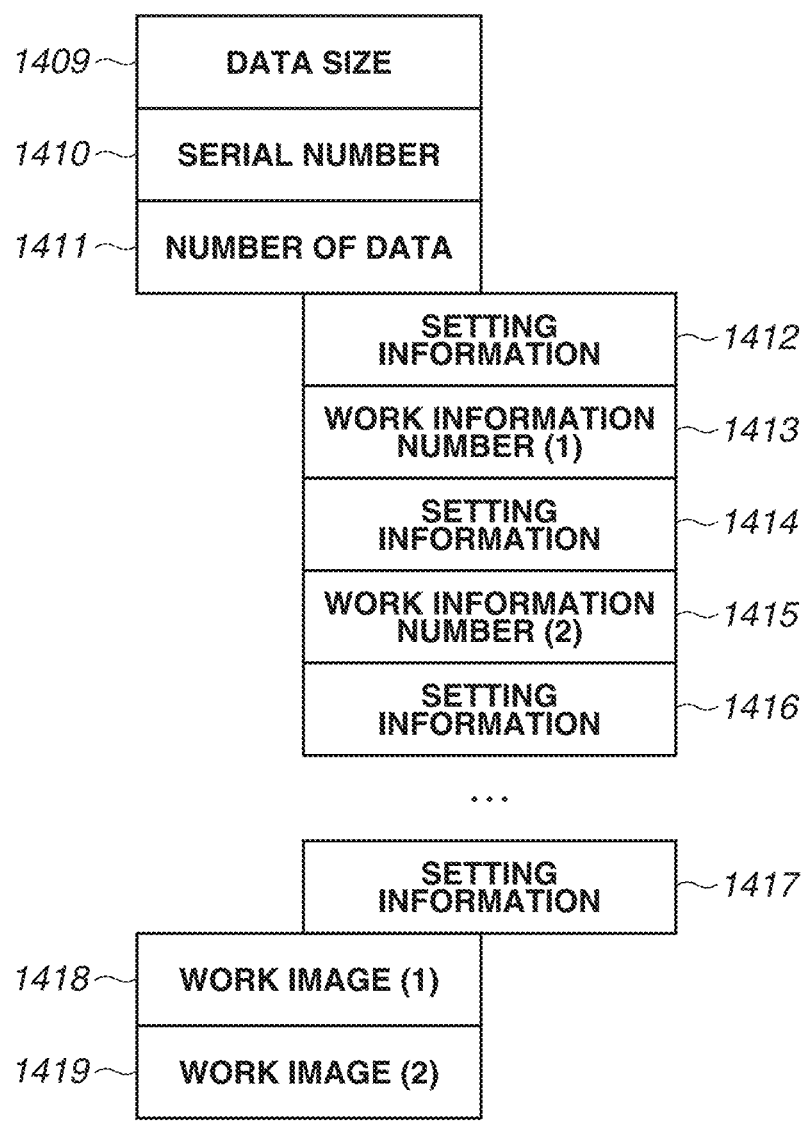
FIG. 19 is a diagram illustrating an example of a structure of data transmitted from the maintenance terminal to the MFP according to the exemplary embodiment of the present invention.

Now, the data structure of the maintenance data transmitted to the MFP 105 will be described with reference to FIG. 19. A data size 1409 is the data size of the entire maintenance data. A serial number 1410 is data indicating the serial number of the MFP 105. A number of data 1411 is data indicating the number of pieces of data of the following setting information, work information, and work image. Pieces of setting information 1412, 1414, 1416, and 1417 are each the setting information generated in step S1010 illustrated in FIG. 10 and are data structured as indicated by 1104 to 1107 in FIG. 17. A work information number (1) 1413 and a work information number (2) 1415 are each data indicating that there is the work information, and an instruction to display the image generated by converting the work information structured as indicated by 1108 to 1110 in FIG. 17. A work image (1) 1418 is image data corresponding to the work information number (1) 1413, and is the image data corresponding to the work information generated in step S1014 illustrated in FIG. 10. A work image (2) 1419 is image data corresponding to the work information number (2) 1415, and is the image data generated in step S1014. The CPU 201 transmits the setting information and the work information number to the MFP 105 in the order in which the operator has set them. In FIG. 19, the work information number is used as an index, and the work image corresponding to the work information number is added subsequently to all the pieces of setting information. Alternatively, the work image can be added to the position where the work information number is illustrated in FIG. 19, and the maintenance terminal 102 can transmit the maintenance data in which the setting information and the work image are arranged in order to the MFP 105.

The CPU 201 transmits the maintenance data illustrated in FIG. 19 to the MFP 105, and ends the flowchart illustrated in FIG. 10.

In the present exemplary embodiment, the operator arranges the setting information and the work information number in the order in which the operator has set them, and transmits them to the MFP 105. Alternatively, an "EDIT" button can be displayed on the procedure input screen 1505, and a screen on which the operator can change the order of the setting information and the work information set by the operator until that time can be displayed when the operator selects the "EDIT" button. This screen allows the operator to change the order by selecting the "EDIT" button even if the operator inadvertently sets the setting information and the work information in order different from the intended order.

Figure 20:
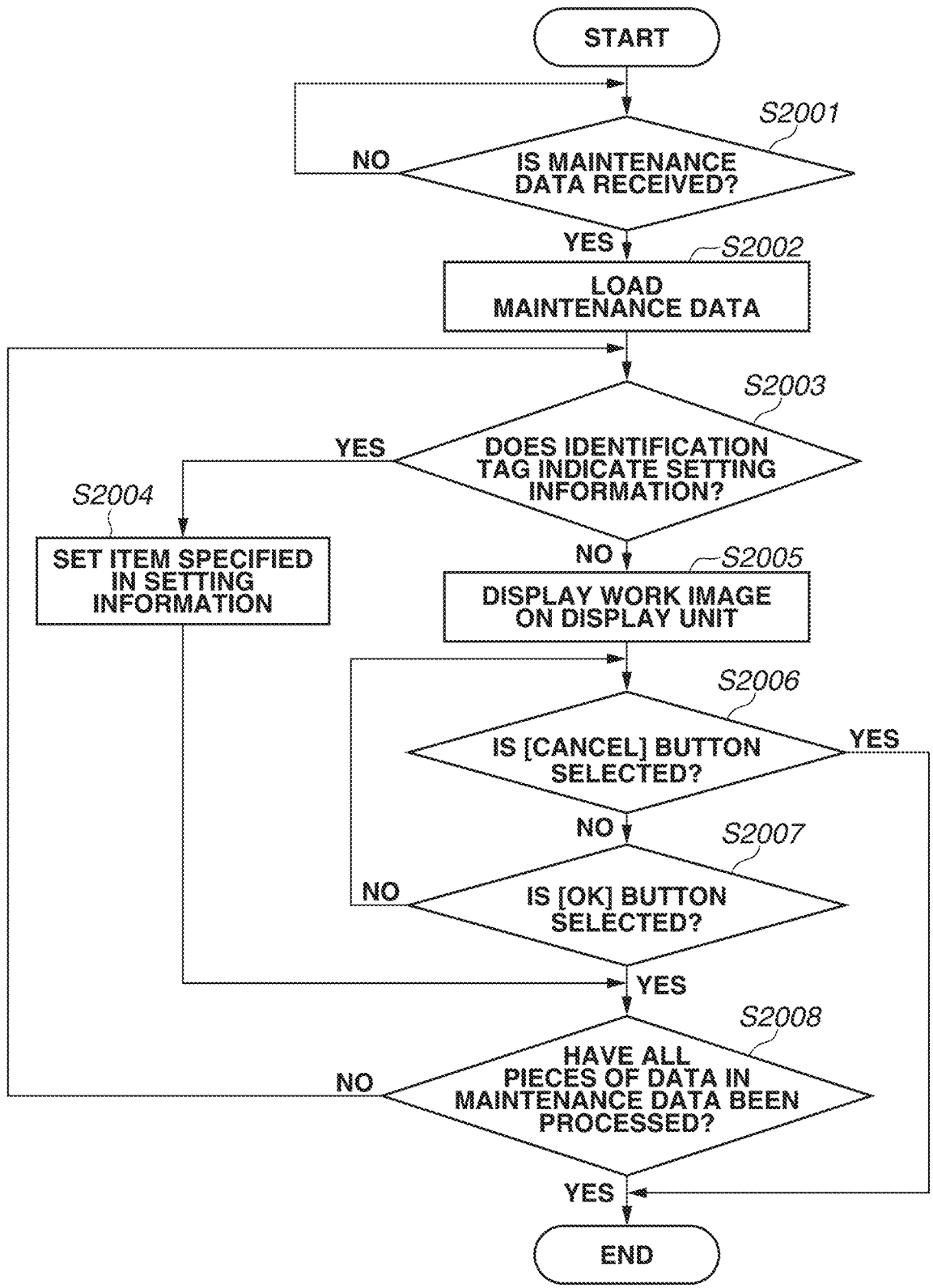
FIG. 20 is a flowchart illustrating processing of receiving the maintenance data by the MFP according to the exemplary embodiment of the present invention.

FIG. 20 is a flowchart illustrating processing performed by the MFP 105 after the MFP 105 receives the maintenance data from the maintenance terminal 102. The processing illustrated in the flowchart is implemented by the CPU 401 executing the program stored in the HDD 416. The processing illustrated in FIG. 20 is started after the MFP 105 is started up.

In step S2001, the CPU 401 determines whether the network I/F 405 has received the maintenance data. The CPU 401 analyzes the received data, and determines whether the received data is the maintenance data based on whether the data contains the identification tag indicating the setting information or the work information.

If the received data is not the maintenance data (NO in step S2001), the CPU 401 performs processing corresponding to the received data, and returns the process to step S2001. If the received data is the maintenance data (YES in step S2001), in step S2002, the CPU 401 loads the maintenance data into the DRAM 404. Then, the CPU 401 analyzes the maintenance data loaded into the DRAM 404 in order from the top to the bottom.

In step S2003, the CPU 401 determines whether the identification tag is the tag indicating the setting information. If the identification tag is the tag indicating the setting information (YES in step S2003), in step S2004, the CPU 401 identifies the setting item based on the setting position information 1105, the attribute 1106, and the data 1107 that follow the identification tag, and stores the setting value into the DRAM 404. For example, a case is cited where 0001/0001/0002/0001 is set in the setting position information 1105, a character string is set in the attribute 1106, and "A/B SIZE" is set in the data 1107 that follow the identification tag indicating the setting information detected in step S2003. The CPU 401 sets "A/B SIZE" on the screen that is displayed by the user operating the operation unit 415 and selecting "PAPER SETTINGS", "PAPER SIZE FOR AUTOMATIC DETECTION", and "PAPER SIZE FOR DETECTION IN CASSETTE 3" on the screen for setting the preferences. Then, the CPU 401 stores the setting value into the DRAM 404. The CPU 401 acquires the positions of the paper guides in the cassette 3, selects the paper size in terms of an A/B size that corresponds to the acquired information, and stores it into the DRAM 404 as the size corresponding to the cassette 3.

If the identification tag does not indicate the setting information in step S2003 (NO in step S2003), in step S2005, the CPU 401 determines that the identification tag is the tag indicating the work information and displays the work image corresponding to the work information tag on the display of the operation unit 415. As a result, the screen illustrated in FIG. 9 is displayed on the LCD panel of the operation unit 415. The CPU 401 controls the display on the LCD panel of the operation unit 415 in this manner.

In step S2006, the CPU 401 determines whether the "CANCEL" button 3102 is selected. If the "CANCEL" button 3102 is selected (YES in step S2006), the CPU 401 ends the processing illustrated in the present flowchart. In other words, the CPU 401 ends the processing without performing the processing based on the setting information and the work information subsequent to the present work image.

If the "CANCEL" button 3102 is not selected (NO in step S2006), in step S2007, the CPU 401 determines whether the "OK" button 3101 is selected. If the "OK" button 3101 is not selected (NO in step S2007), the CPU 401 returns the process to step S2006. If the "OK" button 3101 is selected (YES in step S2007), in step S2008, the CPU 401 determines whether all the processing has been completed on the received maintenance data. For example, the CPU 401 determines that all the processing on the maintenance data has been completed if the data reception has been completed for as many pieces of data as the number of pieces of data set in the number of data 1411 in the maintenance data illustrated in FIG. 19. The method for determining whether the reception of the maintenance data has been completed may be a method different from the above-described method. For example, in response to the selection of the "TRANSMIT" button 1510 in step S1005 illustrated in FIG. 10, the CPU 201 of the maintenance terminal 102 adds information indicating the end of the maintenance data to the maintenance data, and transmits the maintenance data to the MFP 105. The CPU 401 of the MFP 105 analyzes the received data, and determines that the processing performed on the maintenance data has been completed if the analyzed data is the information indicating the end of the maintenance data.

If all the processing on the maintenance data has been completed (YES in step S2008), the CPU 401 ends the processing illustrated in FIG. 20. After ending the processing illustrated in FIG. 20, the CPU 401 starts the processing illustrated in FIG. 20 again to receive new maintenance data. If not all the processing on the maintenance data has been completed (NO in step S2008), the CPU 401 returns the process to step S2003.

The MFP 105 interprets the data received from the maintenance terminal 102 in order from the top to bottom, and configures the setting and displays the work screen in order. In this manner, the user can perform the work and configure the setting in the order that the operator has set the setting information and the work information. Thus, regarding processing in which the order of the setting and the work is determined, the user can configure the setting and perform the work in compliance with this order.

In this manner, the MFP 105 can be set even without requiring a service engineer to directly operate the MFP 105 by generating the maintenance data containing the setting information and the work information on the maintenance terminal 102 and causing the MFP 105 to configure the setting based on this maintenance data. Further, the operator can complete the generation of the data required for the setting without waiting for the completion of the work by the user.

Further, the operator can notify the user of the work that is to be performed by the user by displaying the work that the operator wants the user to perform on the operation unit 415 of the MFP 105 based on the work information contained in the maintenance data.

In the present exemplary embodiment, after the entire maintenance data has been completed on the maintenance terminal 102, the maintenance terminal 102 collectively transmits the completed maintenance data to the MFP 105. However, the maintenance terminal 102 may be configured to transmit the setting information, the work information number, and the work image individually in order. For example, if the operator selects the "TRANSMIT" button 1510 on the procedure input screen 1505, the maintenance terminal 102 transmits the first setting information to the MFP 105. After configuring the setting based on the received setting information, the MFP 105 transmits a notification indicating the completion of the setting to the maintenance terminal 102. In response to reception of the notification indicating the completion of the setting, the maintenance terminal 102 transmits the next setting information or the next set of work information number and work image to the MFP 105. When the maintenance terminal 102 transmits the work information number and the work image to the MFP 105, the MFP 105 outputs a notification indicating the completion of the work to the maintenance terminal 102 in response to the user selecting the "OK" button 3101 on the remote setting screen illustrated in FIG. 9. The maintenance terminal 102 receives the notification indicating the completion of the work, and transmits the next setting information or the next set of work information number and work image to the MFP 105. The maintenance terminal 102 may be configured to repeat the operation until completing the transmission of all the pieces of work information and setting information generated by the operator. The maintenance terminal 102 may be configured to transmit only the work image instead of transmitting the set of work information number and work image in the case where the maintenance terminal 102 does not collectively transmit the maintenance data in the above-described manner.

In the present exemplary embodiment, it has been described that the operator selects whether to set the data or set the work on the procedure input screen 1505 and generates the setting information and the work information. The maintenance terminal 102 may be configured to cause the operator to set the work subsequent to setting the data based on the selected setting information. For example, when the operator selects "PAPER SETTINGS" 1603 as illustrated in FIG. 14 on the data setting screen 1601 and generates the setting information, conceivable work subsequent thereto is work of placing the paper into the cassette to which the paper setting is applied. The maintenance terminal 102 may be configured to display the work setting screen 1701 without displaying the procedure input screen 1505 after the operator selects the "PAPER SETTINGS" 1603 and selects the "OK" button 1615 at this time.

In the present exemplary embodiment, the maintenance terminal 102 generates the image data for the display corresponding to the work information set by the operator, and transmits the generated image data to the MFP 105.

Alternatively, the maintenance terminal 102 can transmit the work information set by the operator directly to the MFP 105 as the work information, and the MFP 105 generates the image data for the display from the received work information.

Further, in the present exemplary embodiment, a case has been described where the user loads the new paper into the paper cassette and configures setting of the paper by way of example. Besides that, the present exemplary embodiment may be applied to adjustment of the color or the image quality of a printed image or replacement of consumables such as a cartridge containing toner or ink and a waste toner container by using the present information processing system.

The present invention can also be implemented by performing the following processing. Specifically, the present invention can also be implemented by processing of supplying software (program) capable of implementing the functions of the above-described exemplary embodiment to a system or an apparatus via a network or various kinds of storage media, and causing a computer (or CPU or micro processing unit (MPU)) of the system or apparatus to read out and execute the program code. In this case, the computer program and the storage medium storing the computer program will constitute the present invention.

The information processing system according to the present exemplary embodiment allows the operator to set the instruction for configuring the setting required after the manual work by the user without waiting for the completion of the manual work by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
a controller including a processor, the controller configured to:
receive, from an external apparatus, a first instruction for displaying information indicating work desired to be performed by a user operating the image forming apparatus;
receive, from the external apparatus, a second instruction for causing the image forming apparatus to set a setting value;
display the information indicating work desired to be performed by the user based on the first instruction and display information regarding the second instruction; and
set the setting value according to the received second instruction upon completion of the work by the user.

2. The image forming apparatus according to claim 1, wherein the setting value is a setting value related to recording medium to be used for image forming.

3. The image forming apparatus according to claim 2, wherein the setting value related to the recording medium is a setting value indicating a size of the recording medium.

4. The image forming apparatus according to claim 2, wherein the setting value related to the recording medium is a media type of the recording medium.

5. The image forming apparatus according to claim 4, wherein the work is work that a user sets the recording medium to a cassette.

6. The image forming apparatus according to claim 5, wherein the cassette is indicated by the second instruction.

7. The image forming apparatus according to claim 1, wherein the controller is further configured to:
receive a user instruction indicating completion of the work; and
set, as a response to the user instruction, the setting value according to the received second instruction.

8. The image forming apparatus according to claim 1, wherein the controller is further configured to:
determine the information to be displayed based on the received first and second instructions.

9. The image forming apparatus according to claim 1, wherein the controller executes process for image forming based on the setting value set based on the received second instruction.

10. An image forming apparatus comprising:
a display; and
a controller including a processor, the controller configured to:
receive, from an external apparatus, a first instruction including first information indicating a cassette and second information indicating a media type of recording medium set to the cassette;
receive, from the external apparatus, a second instruction for displaying information indicating work for a user to set recording medium based on the first information and the second information;
display, on the display, the information indicating work for a user to set recording medium based on the second instruction, a type of which is indicated by the second information to the cassette indicated by the first information; and
set the media type of the recording medium indicated by the indicated second information corresponding to the cassette indicated by the indicated first information according to the received first instruction upon completion of the work by the user.

11. The image forming apparatus according to claim 10, wherein the controller is configured to:
   receive a user instruction indicating completion of the work; and
   set the media type of the recording medium indicated by the second information corresponding to the cassette indicated by the indicated first information.

12. The image forming apparatus according to claim 10, further comprising:
   an image forming unit configured to form an image on recording medium conveyed from the cassette based on information related to the media type.

13. The image forming apparatus according to claim 10, wherein the displayed information is a message indicating for a user to set the recording medium a type of which is the media type indicated by the second information to the cassette.

14. The image forming apparatus according to claim 10, wherein the received first instruction includes third information indicating a size of the recording medium and the controller sets the size indicated by the third information corresponding to the cassette indicated by the first information.

15. The image forming apparatus according to claim 10, wherein the controller is further configured to:
   cancel, based on another user instruction, the setting based on the first information and the second information.

16. A method for controlling an image forming apparatus, the method comprising:
   receiving, from an external apparatus, a first instruction for displaying information indicating work desired to be performed by a user operating the image forming apparatus;
   receiving, from the external apparatus, a second instruction for causing the image forming apparatus to set a setting value;
   displaying the information indicating work desired to be performed by the user based on the first instruction and displaying information regarding the second instruction; and
   setting the setting value according to the received second instruction upon completion of the work by the user.

17. The method according to claim 16, wherein the setting value is a setting value indicating a size of a recording medium or a media type of the recording medium.

18. The method according to claim 16, wherein the work is work that a user sets the recording material to a cassette.

\* \* \* \* \*